(12) United States Patent
Park et al.

(10) Patent No.: US 8,587,511 B2
(45) Date of Patent: Nov. 19, 2013

(54) LIQUID CRYSTAL DISPLAY PANEL, LIQUID CRYSTAL DISPLAY DEVICE HAVING THE SAME, AND METHOD OF MANUFACTURING THE SAME

(75) Inventors: Won-Sang Park, Yongin-si (KR);
Kee-Han Uh, Yongin-si (KR);
Hyung-Guel Kim, Yongin-si (KR);
Jong-Hwan Cho, Gunpo-si (KR);
Sang-Jin Park, Yongin-si (KR);
Jae-Hoon Jung, Anyang-si (KR);
Young-Bae Jung, Suwon-si (KR)

(73) Assignee: Samsung Display Co., Ltd. (KR)

( * ) Notice: Subject to any disclaimer, the term of this patent is extended or adjusted under 35 U.S.C. 154(b) by 1556 days.

(21) Appl. No.: 10/699,142

(22) Filed: Oct. 30, 2003

(65) Prior Publication Data
US 2004/0169625 A1 Sep. 2, 2004

(30) Foreign Application Priority Data

Feb. 28, 2003 (KR) .......................... 10-2003-0012768
Apr. 17, 2003 (KR) .......................... 10-2003-0024380

(51) Int. Cl.
*G09G 3/36* (2006.01)
(52) U.S. Cl.
USPC ............ 345/104; 345/173; 345/182; 345/207
(58) Field of Classification Search
USPC ............ 345/81, 87–101, 173, 204–207, 210, 345/690, 104, 175–176, 179, 182–183; 250/200, 332, 333, 553; 349/25; 341/5; 178/18.01, 18.11, 19.01, 19.05
See application file for complete search history.

(56) References Cited

U.S. PATENT DOCUMENTS

| | | | | |
|---|---|---|---|---|
| 4,345,248 A * | 8/1982 | Togashi et al. | ................. | 345/90 |
| 4,952,031 A * | 8/1990 | Tsunoda et al. | ................. | 349/24 |
| 5,051,570 A * | 9/1991 | Tsujikawa et al. | .......... | 250/201.1 |
| 5,168,382 A * | 12/1992 | Tsujikawa | ...................... | 349/17 |
| 5,194,862 A * | 3/1993 | Edwards | ........................ | 341/20 |
| 5,204,661 A * | 4/1993 | Hack et al. | ..................... | 345/88 |

(Continued)

FOREIGN PATENT DOCUMENTS

| | | |
|---|---|---|
| CN | 1260883 | 7/2000 |
| JP | 57-127240 | 7/1982 |

(Continued)

OTHER PUBLICATIONS

English Language Abstract, CN Patent First Publication No. CN 1260883A, Mar. 26, 1998, 1 page.

(Continued)

*Primary Examiner* — Hong Zhou
(74) *Attorney, Agent, or Firm* — Innovation Counsel LLP

(57) ABSTRACT

A liquid crystal display panel includes a first substrate, a second substrate and a liquid crystal layer. The first substrate includes a plurality of pixels and a plurality of sensing parts. Each of the sensing parts generates an output signal containing location information in response to an input signal. The location information indicates a location where the input signal is inputted. The second substrate is connected to the first substrate. The second substrate faces the first substrate. The liquid crystal layer is interposed between the first substrate and the second substrate. The liquid crystal display device needs no additional touch panel, so that no air space exists between the liquid crystal display panel and the touch panel. Therefore, a display quality is enhanced.

14 Claims, 26 Drawing Sheets

(56) References Cited

U.S. PATENT DOCUMENTS

| | | | |
|---|---|---|---|
| 5,386,543 A * | 1/1995 | Bird | 358/1.1 |
| 5,485,177 A * | 1/1996 | Shannon et al. | 345/182 |
| 5,610,629 A * | 3/1997 | Baur | 345/104 |
| 5,838,308 A * | 11/1998 | Knapp et al. | 345/173 |
| 6,184,946 B1 * | 2/2001 | Ando et al. | 349/42 |
| 6,243,069 B1 * | 6/2001 | Ogawa et al. | 345/102 |
| 6,791,640 B1 | 9/2004 | Okamoto et al. | |
| 6,831,710 B2 * | 12/2004 | den Boer | 349/48 |
| 6,947,102 B2 * | 9/2005 | den Boer et al. | 349/12 |
| 6,961,051 B2 * | 11/2005 | Weindorf et al. | 345/175 |
| 6,995,743 B2 * | 2/2006 | Boer et al. | 345/104 |
| 7,009,663 B2 * | 3/2006 | Abileah et al. | 349/12 |
| 7,023,503 B2 * | 4/2006 | den Boer | 349/48 |
| 7,034,309 B2 * | 4/2006 | Mochizuki | 250/370.09 |
| 7,053,967 B2 * | 5/2006 | Abileah et al. | 349/12 |
| 7,061,480 B2 * | 6/2006 | Anderson et al. | 345/207 |
| 7,158,129 B2 * | 1/2007 | Nakajima | 345/207 |
| 7,184,009 B2 * | 2/2007 | Bergquist | 345/90 |
| 7,280,102 B2 * | 10/2007 | Abileah et al. | 345/204 |
| 7,408,598 B2 * | 8/2008 | den Boer et al. | 349/53 |
| 2001/0055008 A1 * | 12/2001 | Young et al. | 345/204 |
| 2002/0030768 A1 * | 3/2002 | Wu | 349/42 |
| 2003/0076295 A1 * | 4/2003 | Nakajima | 345/156 |
| 2003/0156087 A1 * | 8/2003 | Boer et al. | 345/92 |
| 2003/0156230 A1 * | 8/2003 | Boer et al. | 349/42 |
| 2003/0179323 A1 * | 9/2003 | Abileah et al. | 349/24 |
| 2003/0218116 A1 * | 11/2003 | Boer | 250/208.1 |
| 2003/0234759 A1 * | 12/2003 | Bergquist | 345/92 |
| 2004/0046900 A1 * | 3/2004 | Boer et al. | 349/43 |
| 2004/0113877 A1 * | 6/2004 | Abileah et al. | 345/92 |
| 2004/0145575 A1 * | 7/2004 | Weindorf et al. | 345/173 |
| 2005/0285985 A1 * | 12/2005 | Boer et al. | 349/42 |

FOREIGN PATENT DOCUMENTS

| | | |
|---|---|---|
| JP | 07-325319 | 12/1995 |
| JP | 09-114584 | 5/1997 |
| JP | 11-271712 | 8/1999 |
| JP | 11-259234 | 9/1999 |
| KR | 10-2004-0077269 A | 9/2004 |
| TW | 382676 | 2/2000 |

OTHER PUBLICATIONS

English Translation of Chinese Patent Office Action, 16 pages.

* cited by examiner

700

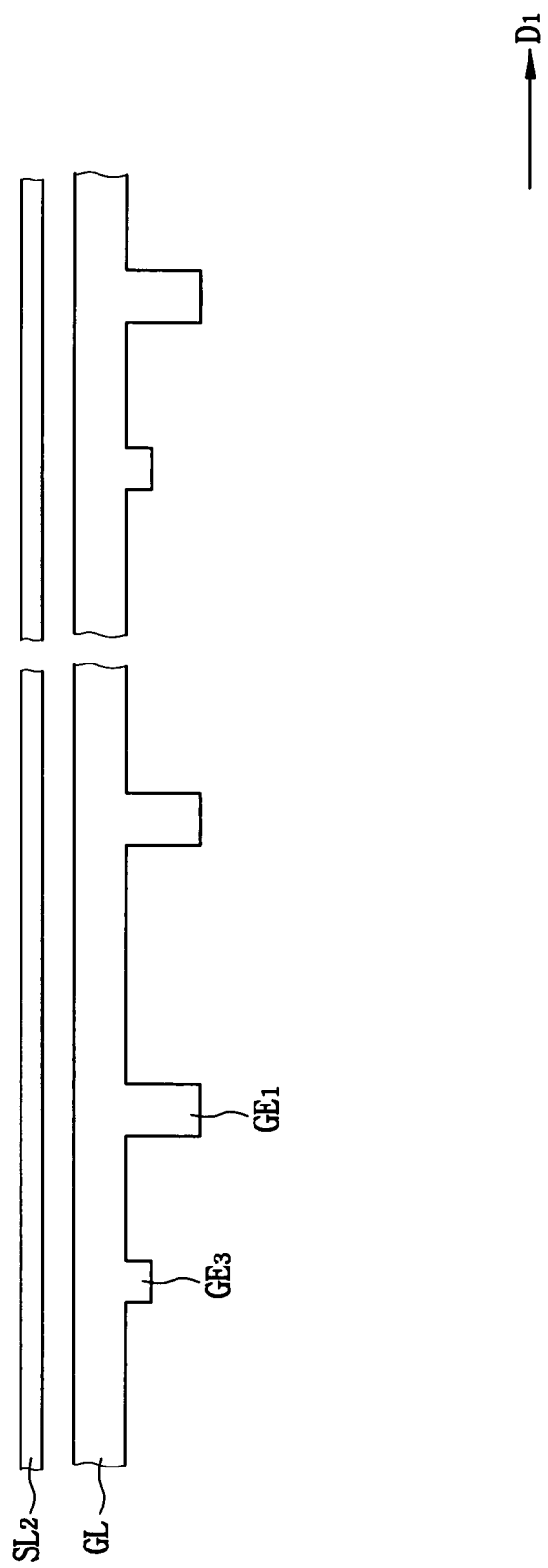

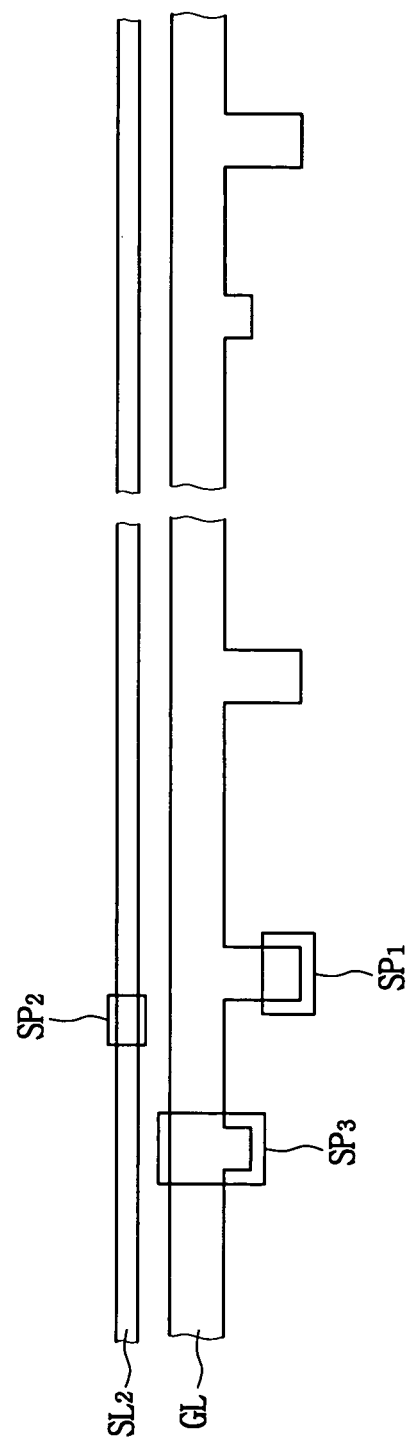

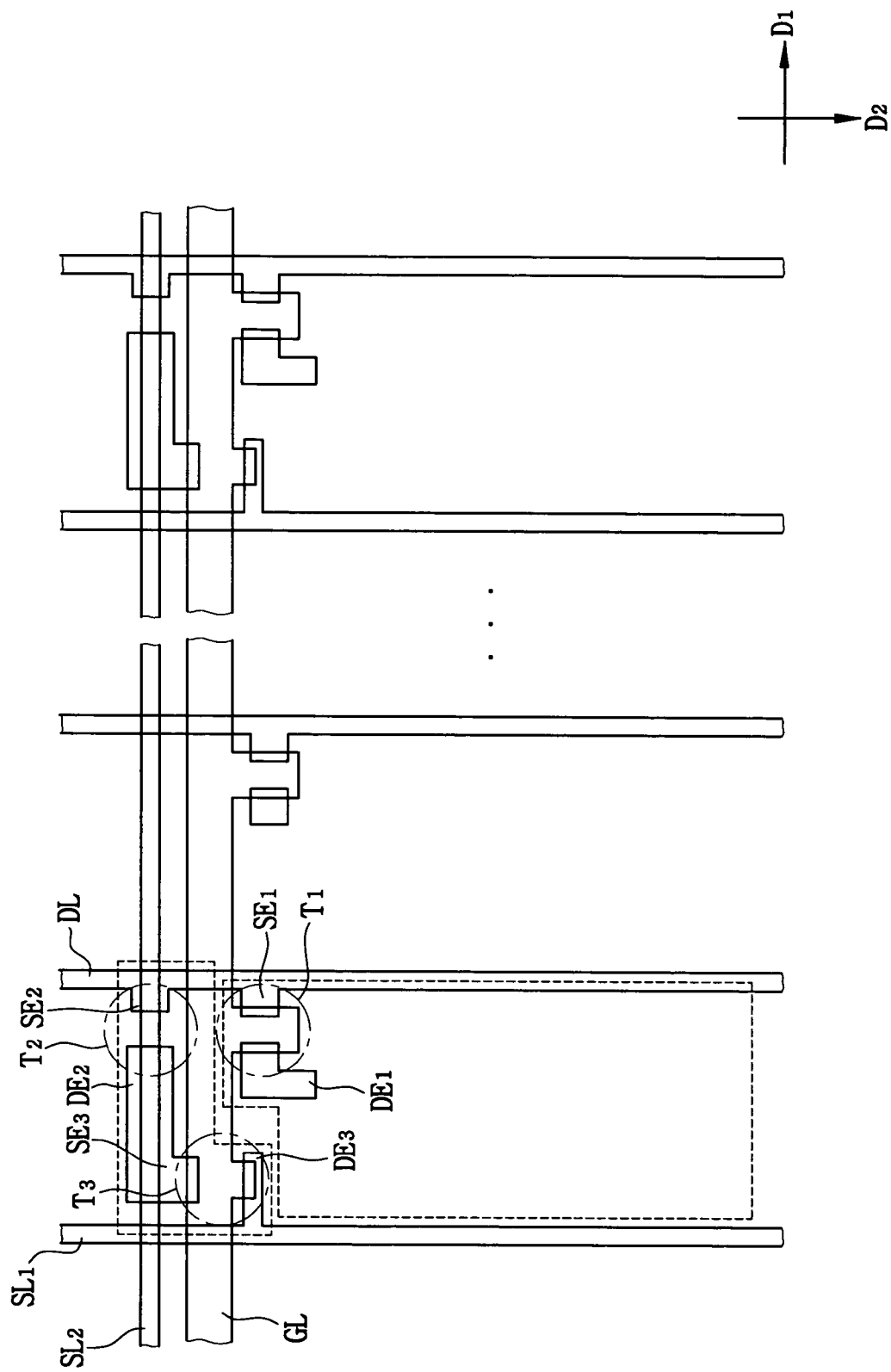

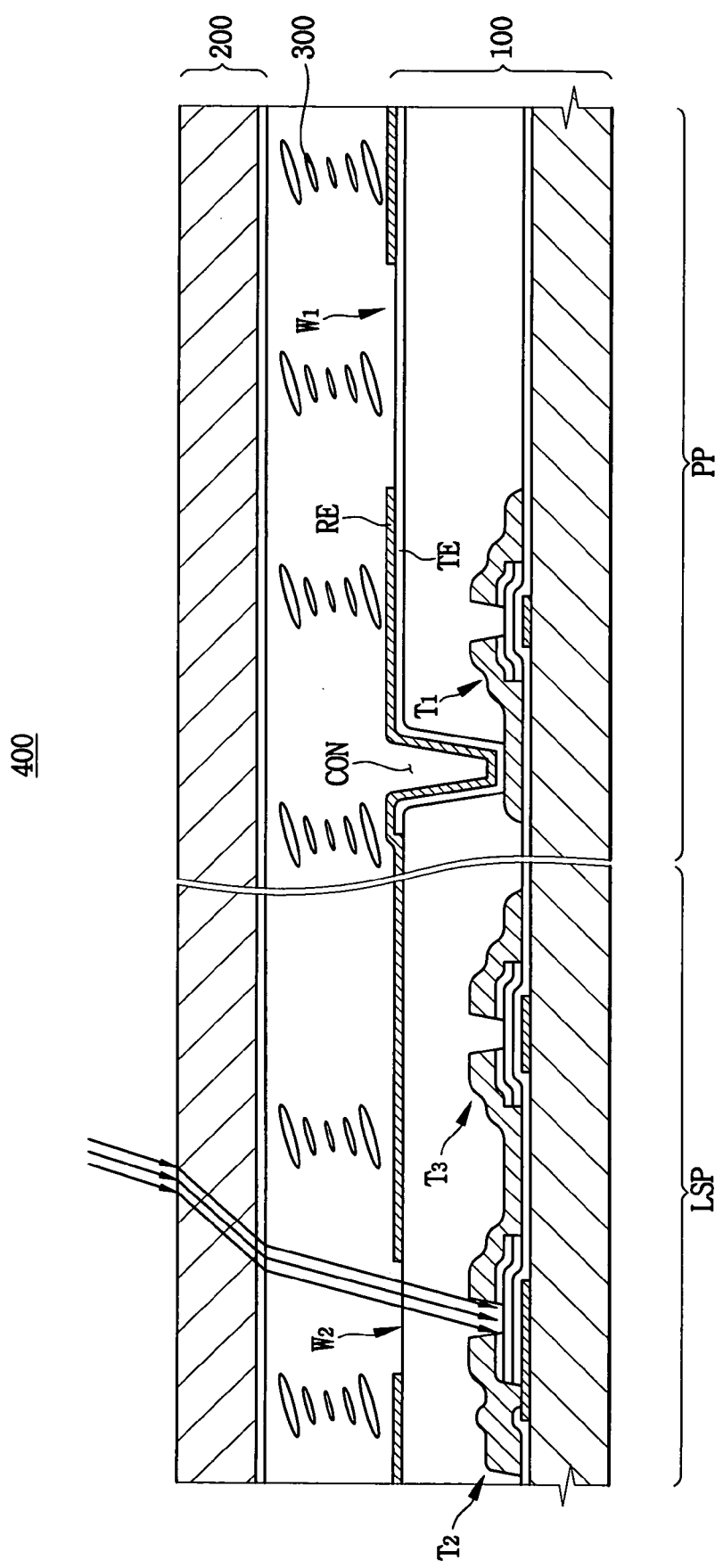

900

LIQUID CRYSTAL DISPLAY PANEL, LIQUID
CRYSTAL DISPLAY DEVICE HAVING THE
SAME, AND METHOD OF MANUFACTURING
THE SAME

CROSS-REFERENCE TO RELATED
APPLICATIONS

This application relies for priority upon Korean Patent Application No. 2003-12768 filed on Feb. 28, 2003, and Korean Patent Application No. 2003-24380 filed on Apr. 17, 2003, the contents of which are herein incorporated by reference in their entirety.

BACKGROUND OF THE INVENTION

1. Field of the Invention

The present invention relates to a liquid crystal display panel, a liquid crystal display device having the liquid crystal display panel and a method of manufacturing the liquid crystal display device, and more particularly to a liquid crystal display panel having reduced thickness and enhanced display quality, a liquid crystal display device having the liquid crystal display panel, and a method of manufacturing the liquid crystal display device.

2. Description of the Related Art

A touch panel is disposed on a display panel, so that a user may touch the touch panel with a hand or other objects so as to select an article displayed via the display panel. A selected position is perceived via the touch panel. The display device drives the display panel according to the article corresponding to the position.

The display device including the touch panel needs no input device such as a keyboard or a mouse. Therefore, the display device including the touch panel becomes widely used.

In recent, a liquid crystal display device employs the touch panel. The touch panel is disposed on a liquid crystal display panel that displays an image, so that a user may input instructions into the liquid crystal display device via the touch panel.

The touch panel includes a first substrate, a second substrate, a first transparent electrode and a second transparent electrode. The first substrate is spaced apart from the second substrate. The first transparent electrode is formed on the first substrate. The second transparent electrode is formed on the second substrate. The first transparent electrode faces the second transparent substrate.

An adhesive layer is interposed between the liquid crystal display panel and the touch panel so as to attach the touch panel on the liquid crystal display panel. A refractive index of the adhesive layer is different from a refractive index of the liquid crystal display panel, so that a light that exits from the liquid crystal display panel is distorted. Therefore, a display quality of the liquid crystal display device is deteriorated.

Further, the touch panel includes the first transparent electrode, the second transparent electrode, the first substrate and the second substrate. Therefore, both manufacturing cost and thickness of the liquid crystal display device are increased.

SUMMARY OF THE INVENTION

Accordingly, the present invention is provided for substantially obviate one or more problems due to limitations and disadvantages of the related art.

It is a feature of the present invention to provide a liquid crystal display panel having a reduced thickness and an enhanced display quality.

In one aspect of the present invention, a liquid crystal display devices having the liquid crystal display panel is provided.

In another aspect of the present invention, a method of manufacturing the liquid crystal display panel is provided.

The liquid crystal display panel includes a first substrate, a second substrate and a liquid crystal layer. The first substrate includes a plurality of pixels and a plurality of sensing parts. Each of the sensing parts generates an output signal containing location information in response to an input signal. The location information indicates a location where the input signal is inputted. The second substrate is connected to the first substrate. The second substrate faces the first substrate. The liquid crystal layer is interposed between the first substrate and the second substrate.

In another aspect, the liquid crystal display device includes a liquid crystal display panel and a control part. The liquid crystal display panel includes a plurality of pixels and a plurality of sensing parts. Each of the sensing parts generates an analog signal containing location information in response to an incident light. The location information indicates a location where the light enters. An image is displayed through the pixels. The control part receives the analog signal and transforms the analog signal into a digital signal. The liquid crystal display device is controlled in response to the digital signal.

In still another aspect, the liquid crystal display device includes a liquid crystal display device and a control part as well. The liquid crystal display panel includes a plurality of pixels and a plurality of sensing parts. Each of the sensing parts generates an analog signal containing location information in response to a compression of the liquid crystal display panel. The location information indicates a location on which the liquid crystal display device is compressed. An image is displayed through the pixels. The control part receives the analog signal first and then the control part transforms the analog signal into a digital signal. The liquid crystal display device is controlled in response to the digital signal.

In order to manufacture a liquid crystal display device, a first substrate including a plurality of pixels and a plurality of sensing parts is formed. Each of the sensing parts generates an output signal containing location information in response to an input signal. The location information indicates a location where the input signal is inputted. A second substrate is formed. Then, the first substrate is combined with the second substrate. A liquid crystal layer is interposed between the first substrate and the second substrate.

The liquid crystal display panel includes a light sensing part (or compression sensing part) for generating an analog signal containing location information of position where the light enters (or where the liquid crystal display panel is compressed).

Therefore, the liquid crystal display device needs no additional touch panel, so that no air space is formed between the liquid crystal display panel and the touch panel. Therefore, a display quality is enhanced. Further, a thickness of the liquid crystal display device is reduced.

The light sensing part (or the compression sensing part) is formed via the process of manufacturing the liquid crystal display panel, so that an additional process is not necessary. Thus, a manufacturing cost is reduced and productivity is enhanced on the other hand.

Further, a count (or number) of switching devices connected to a first data line is equal to a count of switching devices connected to a second data line, so that electrical load of the data lines are equal to each other. Therefore, electrical load is reduced, and a cross talk and a flicker are reduced to enhance the display quality of the liquid crystal display device.

BRIEF DESCRIPTION OF THE DRAWINGS

The above and other features and advantage points of the present invention will become more apparent by describing in detailed exemplary embodiments thereof with reference to the accompanying drawings, in which:

FIGS. 6A to 6D are plan views showing a process of manufacturing an array substrate of FIG. 3;

FIG. 7 is a cross-sectional view showing a liquid crystal display panel according to a second exemplary embodiment of the present invention;

DESCRIPTION OF THE PREFERRED EMBODIMENT

Hereinafter the preferred embodiments of the present invention will be described in detail with reference to the accompanying drawings.

Figure 1:
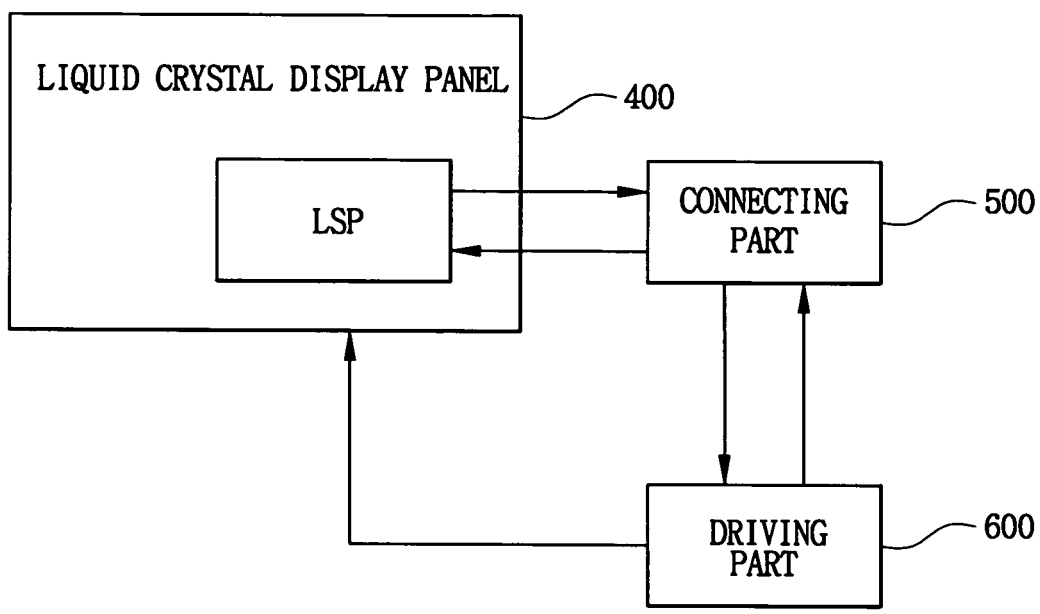
FIG. 1 is a block diagram showing a liquid crystal display device according to a first exemplary embodiment of the present invention.

FIG. 1 is a block diagram showing a liquid crystal display device according to a first exemplary embodiment of the present invention.

Referring to FIG. 1, a liquid crystal display device 700 according to a first exemplary embodiment of the present invention includes a liquid crystal display panel 400, a light sensing part LSP, a connecting part 500 and a driving part 600.

The liquid crystal display panel 400 has a display surface. An image is displayed on the display surface. The liquid crystal display panel 400 receives an incident light provided from a user through the display surface.

The liquid crystal display panel has the light sensing part LSP therein. The light sensing part LSP perceives the incident light through the display surface. The light sensing part LSP provides the connecting part with an analog signal. The analog signal contains location information indicating a location where the incident light entered into the liquid crystal display panel.

The connecting part 500 controls the light sensing part LSP in response to a control signal generated from the driving part 600, so that the light sensing part LSP perceives the incident light provided from the user.

The connecting part 500 transforms the analog signal generated from the light sensing part LSP into a digital signal. The digital signal is transferred to the driving part 600.

The driving part 600 supplies the connecting part 500 with a control signal so as to control the connecting part 500. The driving part 600 outputs a driving signal for driving the liquid crystal display device 700 in response to the digital signal outputted from the connecting part 500. Therefore, the liquid crystal display device 700 displays an image in response to the driving signal outputted from the driving part 600. That is, the liquid crystal display device 700 displays an image in response to instructions corresponding to the position where the incident light enters into the liquid crystal display panel 400.

Figure 2:
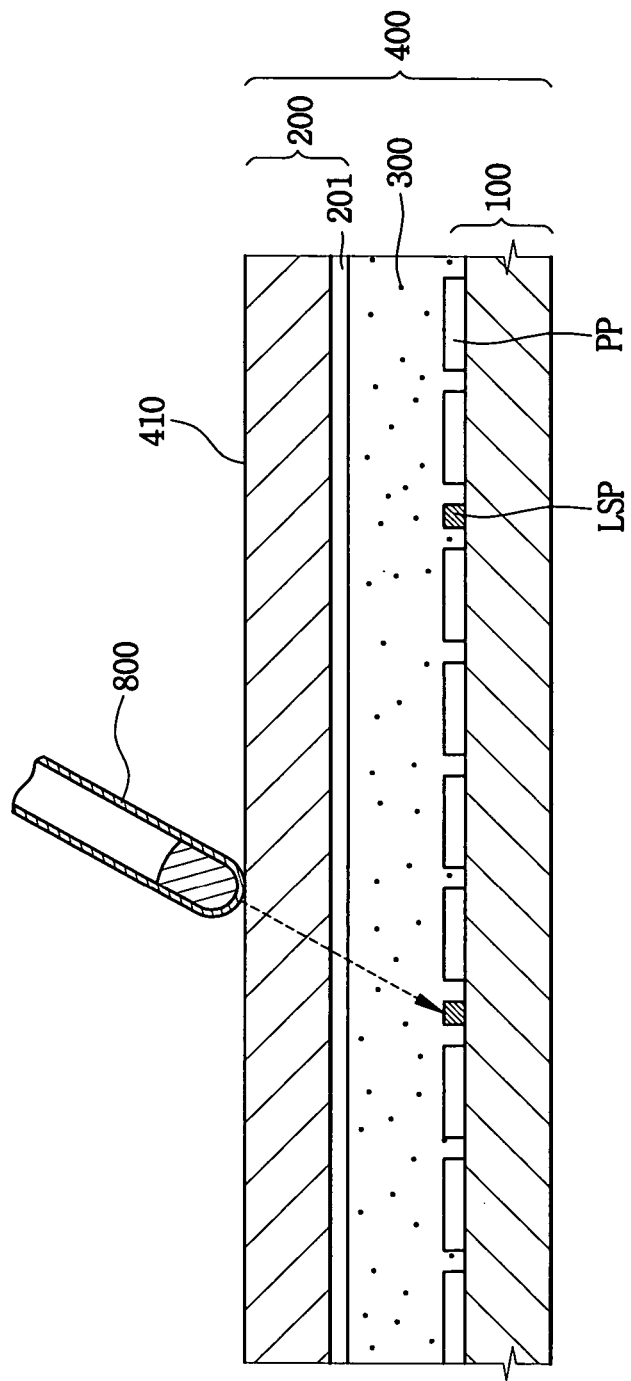
FIG. 2 is a schematic cross-sectional view showing a liquid crystal display panel of FIG. 1.
Figure 3:
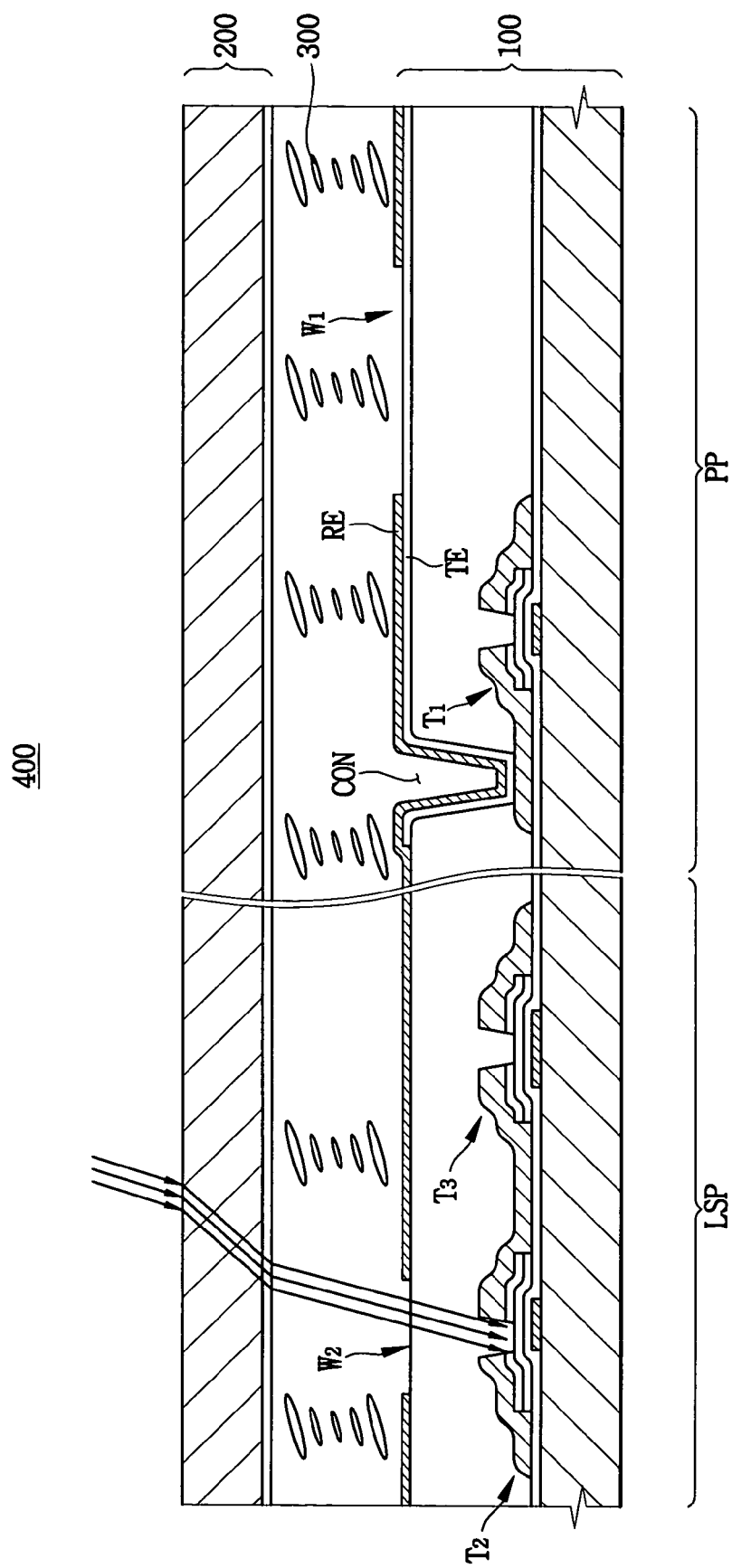
FIG. 3 is an enlarged view showing a liquid crystal display panel of FIG. 2.

FIG. 2 is a schematic cross-sectional view showing a liquid crystal display panel of FIG. 1 and FIG. 3 is an enlarged view showing a liquid crystal display panel of FIG. 2.

Referring to FIGS. 2 and 3, a liquid crystal display panel 400 includes an array substrate 100, a color filter substrate 200 and a liquid crystal layer 300.

The color filter substrate 200 faces the array substrate 100. The liquid crystal layer 300 is interposed between the array substrate 100 and the color filter substrate 200.

The array substrate 100 includes a plurality of pixels PP arranged in a matrix shape. The array substrate 100 also includes a plurality of the light sensing part LSP arranged in a matrix shape. The light sensing part LSP perceives a light generated from a light pen 800. The light generated from the light pen 800 enters at a display face 410 of the color filter substrate 200. The light sensing parts LSP occupies smaller region of the array substrate 100 than the pixels PP, so that an aperture ratio of the liquid crystal display panel 400 is satisfactory.

A user uses the light pen 800 so as to generate the light. The light pen 800 includes a light emitting diode (LED). The light generated from the light emitting diode of the light pen 800 enters into the light crystal display panel 400 via the display surface 410.

Figure 4:
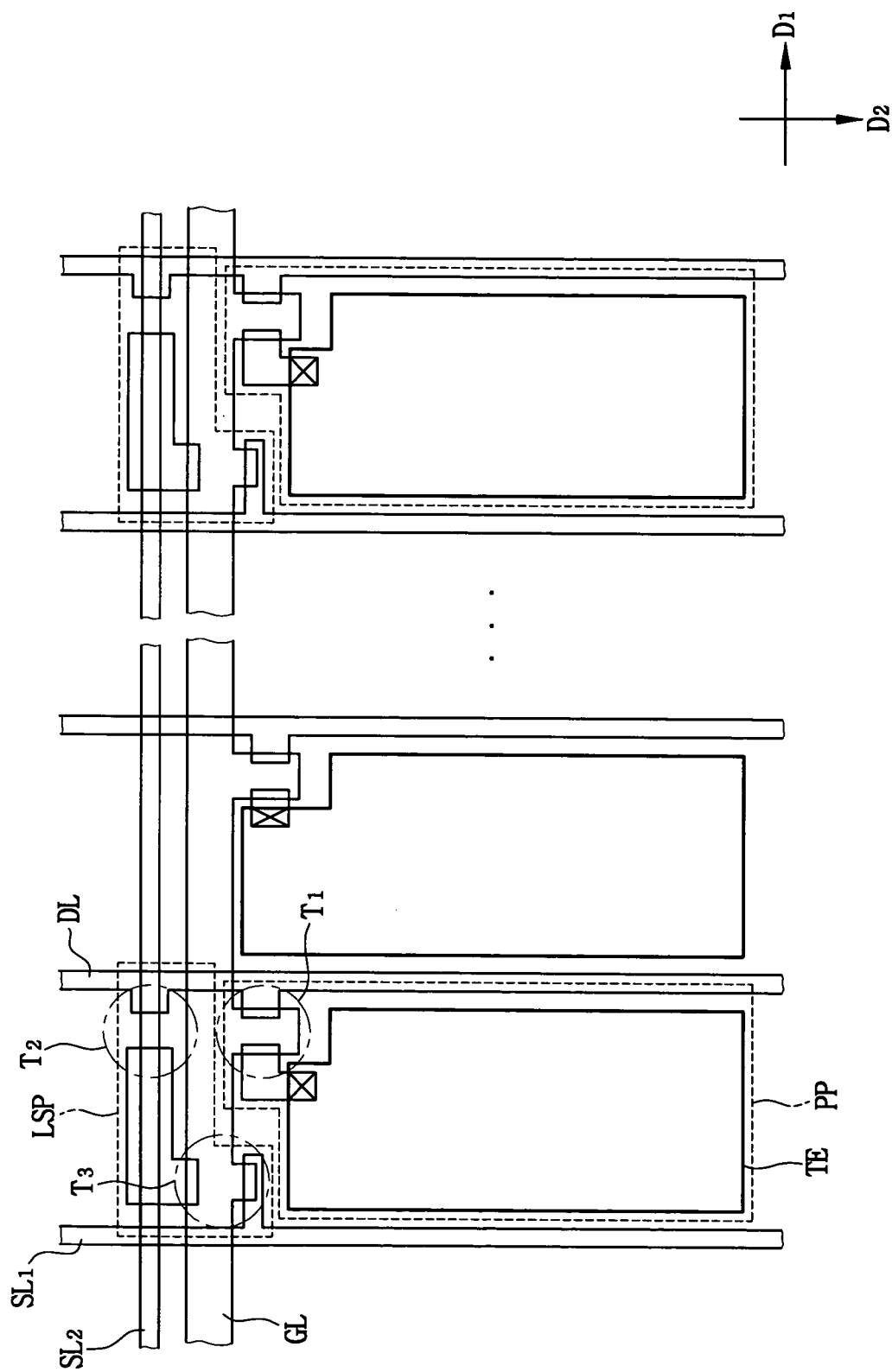
FIG. 4 is a layout showing an array substrate of FIG. 3.

FIG. 4 is a layout showing an array substrate of FIG. 3.

Referring to FIGS. 3 and 4, each of the pixels PP includes a gate line GL, a data line DL, a first thin film transistor T1, a transparent electrode TE and a reflective electrode RE. The gate line GL is extended in a first direction D1. The data line DL is extended in a second direction D2. The second direction D2 is substantially perpendicular to the first direction D1. The first thin film transistor T1 is electrically connected to the gate line GL and with the data line DL respectively. The reflective electrode and the transparent electrode are electrically connected to the first thin film transistor T1.

The first thin film transistor T1 includes a first gate electrode, a first source electrode and a first drain electrode. The first gate electrode diverges from the gate line GL. The first source electrode diverges from the data line DL. The first drain electrode is electrically connected to the transparent electrode TE and the reflective electrode RE.

Each of the light sensing part LSP includes a second thin film transistor T2, a third thin film transistor T3, a first sensor line SL1 and a second sensor line SL2. The second thin film transistor T2 is turned on by an external light. The third thin film transistor T3 is electrically connected to the second thin film transistor T2. The first sensor line SL1 is electrically connected to the third thin film transistor T3. The first sensor line SL1 is extended in the second direction D2.

The light sensing part LSP is extended in the first direction D1. The light sensing part LSP includes a second sensor line SL2 for receiving a signal outputted from the connecting part 500 of FIG. 1.

The second thin film transistor T2 includes a second gate electrode, a second source electrode and a second drain electrode. The second gate electrode diverges from the second sensor line SL2. The second source electrode diverges from the data line DL. The second drain electrode is electrically connected to the third thin film transistor T3. The second sensor line SL2 is formed on a plane on which the gate line GL is formed. The second sensor line SL2 and the gate line GL are spaced apart from each other, such that the second sensor line SL2 is electrically insulated from the gate line GL.

The third thin film transistor T3 includes a third gate electrode, a third source electrode and a third drain electrode. The third gate electrode diverges from the gate line GL. The third source electrode is electrically connected to the second drain electrode of the second thin film transistor T2. The third drain electrode diverges from the first sensor line SL1. The first sensor line SL1 is formed on a plane on which the data line DL is formed. The first sensor line SL1 and the data line DL are spaced apart from each other, such that the first sensor line SL1 is electrically insulated from the data line DL.

The transparent electrode TE is electrically connected to the drain electrode of the first thin film transistor T1 via a contact hole CON. The contact hole CON exposes the first drain electrode of the first thin film transistor T1. The transparent electrode comprises an indium tin oxide (ITO) or an indium zinc oxide (IZO).

The reflective electrode RE is disposed over the transparent electrode TE. The reflective electrode RE has a transmission window W1 and an opening window W2. The transparent electrode TE is exposed through the transmission window W1. The second thin film transistor T2 is exposed through the opening window W2.

The reflective electrode RE may include one layer comprising an aluminum-neodymium (AlNd). The reflective electrode RE may include two layers comprising the aluminum-neodymium (AlNd) layer, and a molybdenum-tungsten (MoW) layer.

The first transmission window W1 forms a transmission portion of the liquid crystal display panel 400. A first light generated from a back light assembly passes through the liquid crystal display panel 400.

The opening window W2 exposes the second thin film transistor T2, so that the second thin film transistor T2 may perceive (or recognize) the light generated from the light pen.

The reflective electrode RE covers the first thin film transistor T1 and the third thin film transistor T3 so as to prevent the first thin film transistor T1 and the third thin film transistor T3 from being exposed to the light.

The second thin film transistor T2 is turned on only when the second thin film transistor T2 perceives the light generated from the light pen. That is, the second thin film transistor T2 is not turned on when the second thin film transistor T2 perceives a first light generated from the back light assembly or a second light such as sunlight. A brightness of the light generated from the light pen is higher than the brightness of the first light generated from the back light assembly and the brightness of the second light such as the sunlight. Therefore, the second thin film transistor T2 operates in response to the light generated from the light pen.

In FIGS. 3 and 4, a transmissive and reflective type liquid crystal display device is disclosed for example. However, the present invention may be applied to a transmissive type liquid crystal display device and to a reflective type liquid crystal display device.

When the present invention is applied to the transmissive type liquid crystal display device, the transmissive type liquid crystal display device includes a covering member for covering the first thin film transistor T1 and the third thin film transistor T3, so that the light may not reach the first thin film transistor T1 and the third thin film transistor T3.

Figure 5:
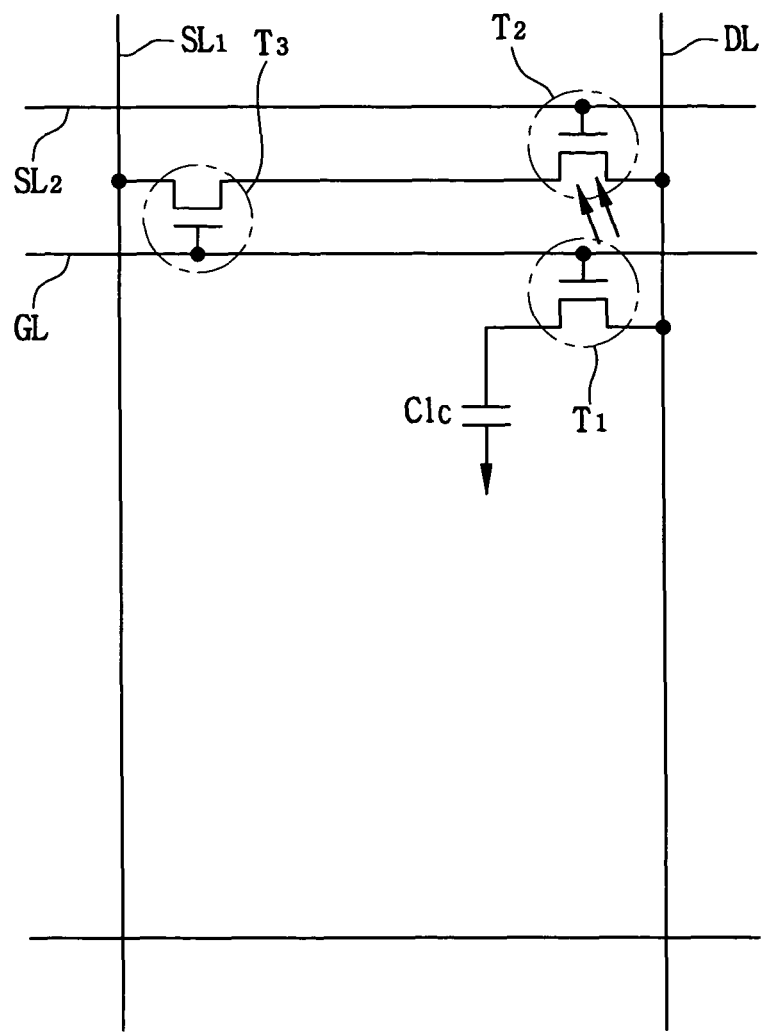
FIG. 5 is an equivalent circuit diagram of a pixel of an array substrate and a light sensing part of FIG. 4.

FIG. 5 is an equivalent circuit diagram of a pixel of an array substrate and a light sensing part of FIG. 4.

Referring to FIGS. 1, 2 and 5, each of the pixels PP includes a gate line GL, a data line DL, a first thin film transistor T1 and a liquid crystal capacitor Clc. The liquid crystal capacitor Clc is referred to as a capacitor formed by a pixel electrode, a common electrode 201 of the color filter substrate 200 and liquid crystal layer interposed between the pixel electrode and a common electrode 201. The liquid crystal capacitor Clc is electrically connected to a first drain electrode of the first thin film transistor T1.

The light sensing part LSP includes a second thin film transistor T2, a third thin film transistor T3, a first sensor line SL1 and a second sensor line SL2.

When a user supplies the light sensing part LSP with a light by using a light pen, the second thin film transistor T2 is turned on in response to the light. Then a first signal (or an image signal) applied to the data line DL is transferred to a second drain electrode of the second thin film transistor T2 via the source electrode of the second thin film transistor T2. The first signal contains image information. The first signal is supplied to a pixel electrode via the first thin film transistor T1.

When the third thin film transistor T3 is turned on in response to a second signal (or gate driving signal) supplied to the gate line GL, the first signal outputted from the drain electrode of the second thin film transistor T2 is supplied to the first sensor line SL1 via the third thin film transistor T3. The second signal corresponds to a gate driving signal outputted from the driving part 600. The second signal is supplied to a gate electrode of the first thin film transistor T1.

The first signal is transferred to the connecting part 500 via the first sensor line SL1. Next operations are explained in the above with reference to FIGS. 1 and 2, so that an explanation of the next operations is omitted.

FIGS. 6A to 6D are plan views showing a process of manufacturing an array substrate of FIG. 3.

Referring to FIG. 6A, a first conductive material is deposited on an array substrate, and patterned, so that a first conductive pattern is formed. The first conductive pattern includes a gate line GL and a second sensor line SL2. The gate line GL and the second sensor line SL2 are extended in a first direction D1.

The first pattern further includes a first gate electrode GE1 of a first thin film transistor T1 and a third gate electrode GE3 of a third thin film transistor T3. The first gate electrode GE1 and the third gate electrode GE3 diverge from the gate line GL.

Referring to FIG. 6B, a semiconductor layer such as an amorphous-silicon layer is deposited and patterned, so that a first semiconductor pattern SP1, a second semiconductor pattern SP2 and a third semiconductor pattern SP3 are formed on the first gate electrode GE1, a second sensor line SL2 and on the third gate electrode line GE3 respectively.

Referring to FIG. 6C, a second conductive material is deposited and patterned, so that a second conductive pattern is formed. The second conductive pattern includes a data line DL and a first sensor line SL1. The data line DL and the first sensor line SL1 are extended in a second direction D2. The second direction D2 is substantially perpendicular to the first direction D1.

The second conductive pattern further includes a first source electrode SE1 of a first thin film transistor T1, a first drain electrode DE1 of a first thin film transistor T1, a second source electrode SE2 of a second thin film transistor T2, a second drain electrode DE2 of a second thin film transistor T2, a third source electrode SE3 of a third thin film transistor T3, and a third drain electrode DE3 of a third thin film transistor T3. The first drain electrode DE1 is spaced apart from the first source electrode SE1. The third drain electrode DE3 diverges from the first sensor line SL1. The third source electrode SE3 is spaced apart from the third drain electrode D3.

Referring again to FIG. 4, a transparent electrode TE is formed on an array substrate. The transparent electrode TE is electrically connected to the first thin film transistor T1. The transparent electrode TE comprises the indium tin oxide or the indium zinc oxide.

Figure 6D:
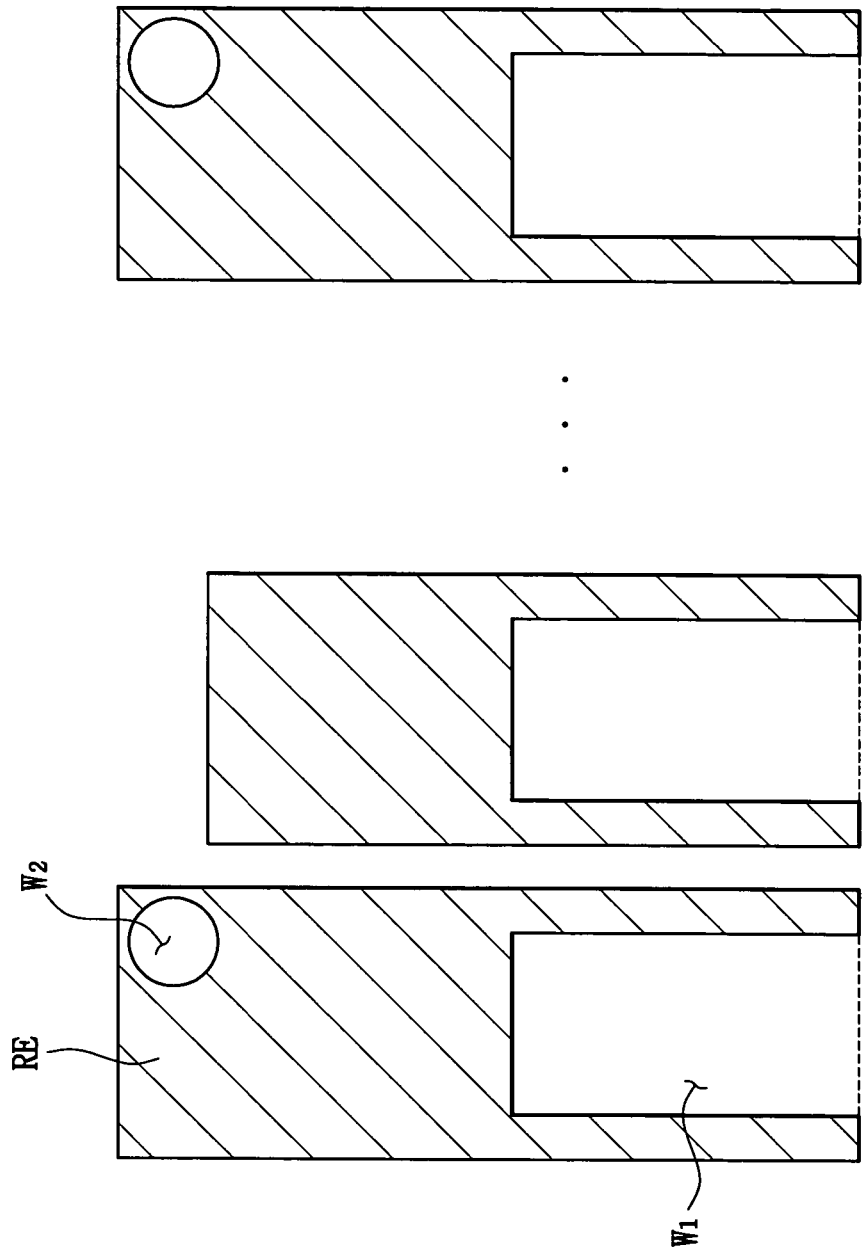

Referring to FIG. 6D, a reflective electrode RE is formed, such that the reflective electrode RE is disposed over the transparent electrode TE. The reflective electrode RE includes a transmission window W1 for exposing a portion of the transparent electrode TE, and an opening window W2 for exposing the second thin film transistor T2.

The transmission window W1 forms a transmission part. The reflective electrode forms a reflection part. The opening window W2 exposes the second thin film transistor T2, so that a light generated from a light pen arrives at the second thin film transistor T2. The reflective electrode RE covers the first thin film transistor T1 and the third thin film transistor T3, so that the light generated from the light pen does not arrive at the first thin film transistor T1 and the third thin film transistor T3.

Figure 8:
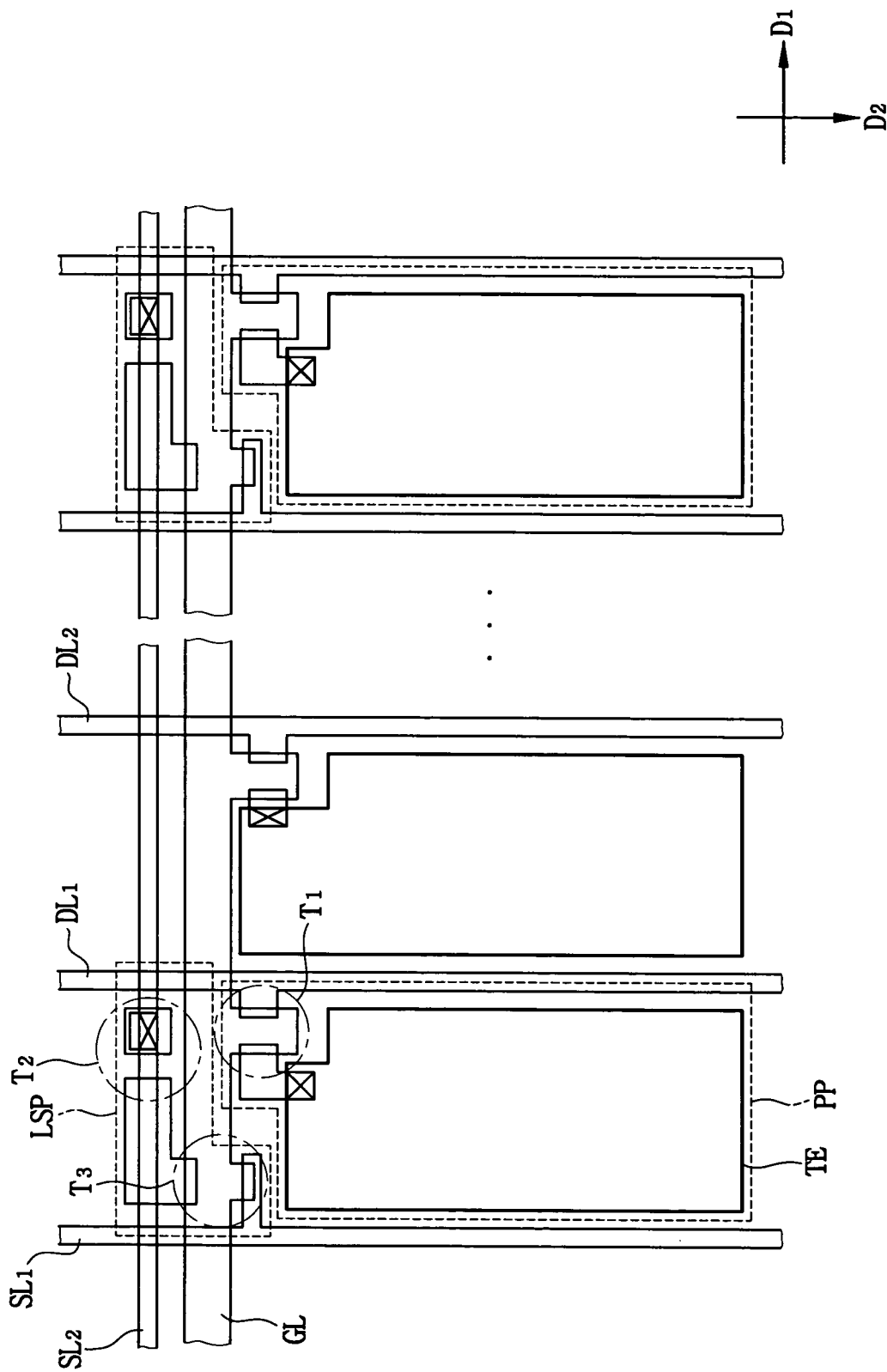
FIG. 8 is a layout showing an array substrate of FIG. 7.

FIG. 7 is a cross-sectional view showing a liquid crystal display panel according to a second exemplary embodiment of the present invention, and FIG. 8 is a layout showing an array substrate of FIG. 7.

Referring to FIGS. 1, 7 and 8, a liquid crystal display panel according to a second exemplary embodiment includes a plurality of pixels PP and a plurality of light sensing parts LSP.

Each of the pixels PP includes a gate line GL, a first data line DL1, a first thin film transistor T1, a transparent electrode and a reflective electrode RE. The gate line is extended in a first direction D1. The first data line DL1 is extended in a second direction D2. The second direction D2 is substantially perpendicular to the first direction D1. The first thin film transistor T1 is electrically connected to the gate line GL and the first data line DL1. The transparent electrode TE and the reflective electrode RE are electrically connected to the first thin film transistor T1.

An image signal applied to the first data line DL1 is supplied to a source electrode of the first thin film transistor T1. The image signal is transferred to a drain electrode of the first thin film transistor T1 in response to a gate driving signal applied to a gate electrode of the first thin film transistor 1 via the gate line GL.

Each of the light sensing parts LSP includes a second thin film transistor T2, a third thin film transistor T3, a first sensor line SL1 and a second sensor line SL2. The third thin film transistor T3 is electrically connected to the second thin film transistor T2. The first sensor line SL1 is extended in the second direction D2. The first sensor line SL1 is electrically connected to the third thin film transistor T3. The second sensor line SL2 is extended in the first direction D1. The second sensor line SL2 receives the first signal from the connecting part 500 of FIG. 1.

The second thin film transistor T2 includes a second gate electrode, a second source electrode and a second drain electrode. A portion of the second sensor line SL2 corresponds to the second gate electrode. The second gate electrode is electrically connected to the second source electrode, so that the first signal supplied to the second gate electrode is transferred to the second source electrode. The second drain electrode is electrically connected to the third thin film transistor T3. The first signal outputted from the connecting part 500 is supplied to the second gate electrode via the second sensor line SL2. Then, the first signal is transferred to the source electrode. Therefore, when the second thin film transistor T2 is turned on in response to the light, the first signal is transferred to the second drain electrode of the second thin film transistor T2.

The third thin film transistor T3 includes a third gate electrode, a third source electrode and a third drain electrode. The third gate electrode diverges from the gate line GL. The third source electrode is electrically connected to the second source electrode of the second thin film transistor T2. The third drain electrode diverges from the first sensor line SL1.

The first signal outputted from the second drain electrode of the second thin film transistor T2 is applied to third source electrode of the third thin film transistor T3.

The third thin film transistor T3 is turned on in response to the second signal (or gate driving signal) that is applied to the gate line GL. When the third thin film transistor T3 is turned on, the first signal of the third source electrode is transferred to the third drain electrode. Then the first signal is transferred to the connecting part 500 via the first sensor line SL1 that is electrically connected to the third drain electrode.

In the first exemplary embodiment of the present invention of FIG. 4, the second source electrode of the second thin film transistor T2 diverges from the data line DL.

However, in the second exemplary embodiment of the present invention of FIG. 8, the second source electrode of the second thin film transistor T2 is electrically connected to the second gate electrode of the second thin film transistor T2 via contact. Therefore, an electrical load of the first data line DL1 is reduced to prevent a delay of the first signal (or image signal).

Further, when the second source electrode diverges from the first data line DL1, a first electrical load of the first data line DL1 that is electrically connected to the light sensing part LSP is different from a second electrical load of the second data line DL2 that is not electrically connected to the light sensing part LSP. Therefore, the liquid crystal display device 400 has demerits such as a cross talk and a flicker.

When the second source electrode is electrically connected to the second gate electrode via the contact, the first electrical load of the first data line DL1 becomes substantially equal to the second electrical load of the second data line DL2, so that display quality of the liquid crystal display device 400 is enhanced.

Figure 9:
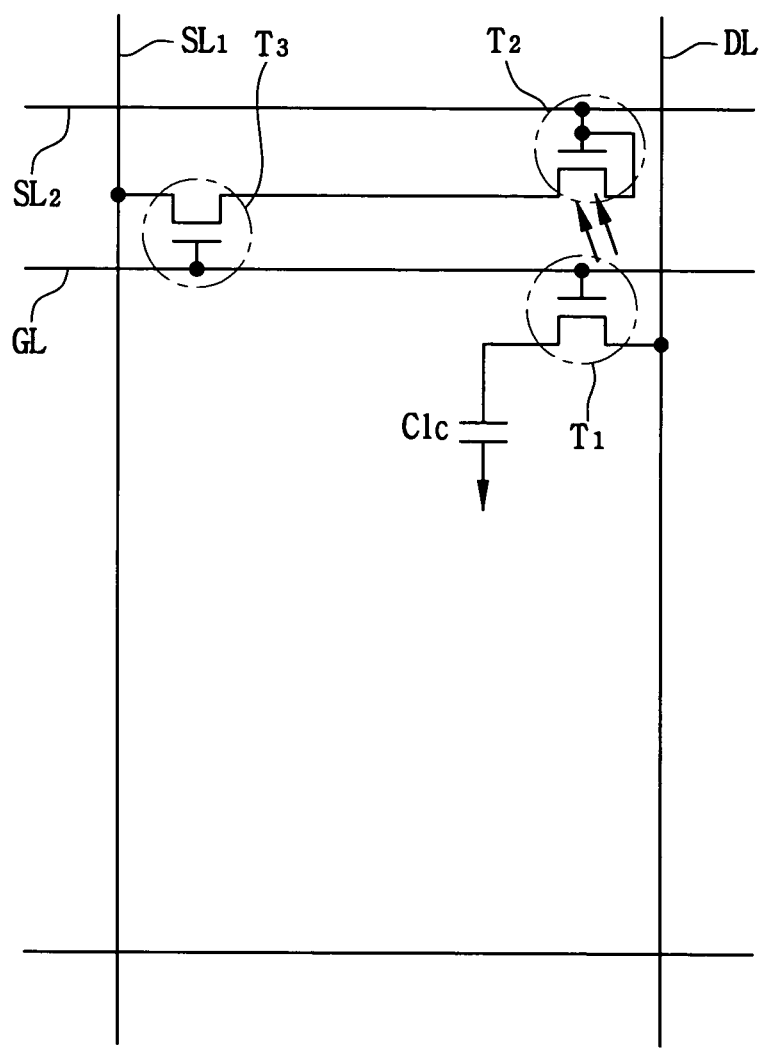
FIG. 9 is an equivalent circuit diagram of a pixel of an array substrate and a light sensing part of FIG. 8.

FIG. 9 is an equivalent circuit diagram of a pixel of an array substrate and a light sensing part of FIG. 8.

Referring to FIGS. 1 and 9, a first signal is outputted from the connecting part 500 is applied to the second sensor line SL2. When a light arrives at a second thin film transistor T2, the second thin film transistor T2 is turned on, so that a first signal applied to the second gate electrode is transferred to the second drain electrode via the second source electrode.

The first signal is transferred from the second drain electrode of the second thin film transistor to the third source electrode of the third thin film transistor T3. When the third thin film transistor T3 is turned on in response to the second signal applied to the gate line GL, the first signal is outputted from the third drain electrode of the third thin film transistor T3.

Figure 10:
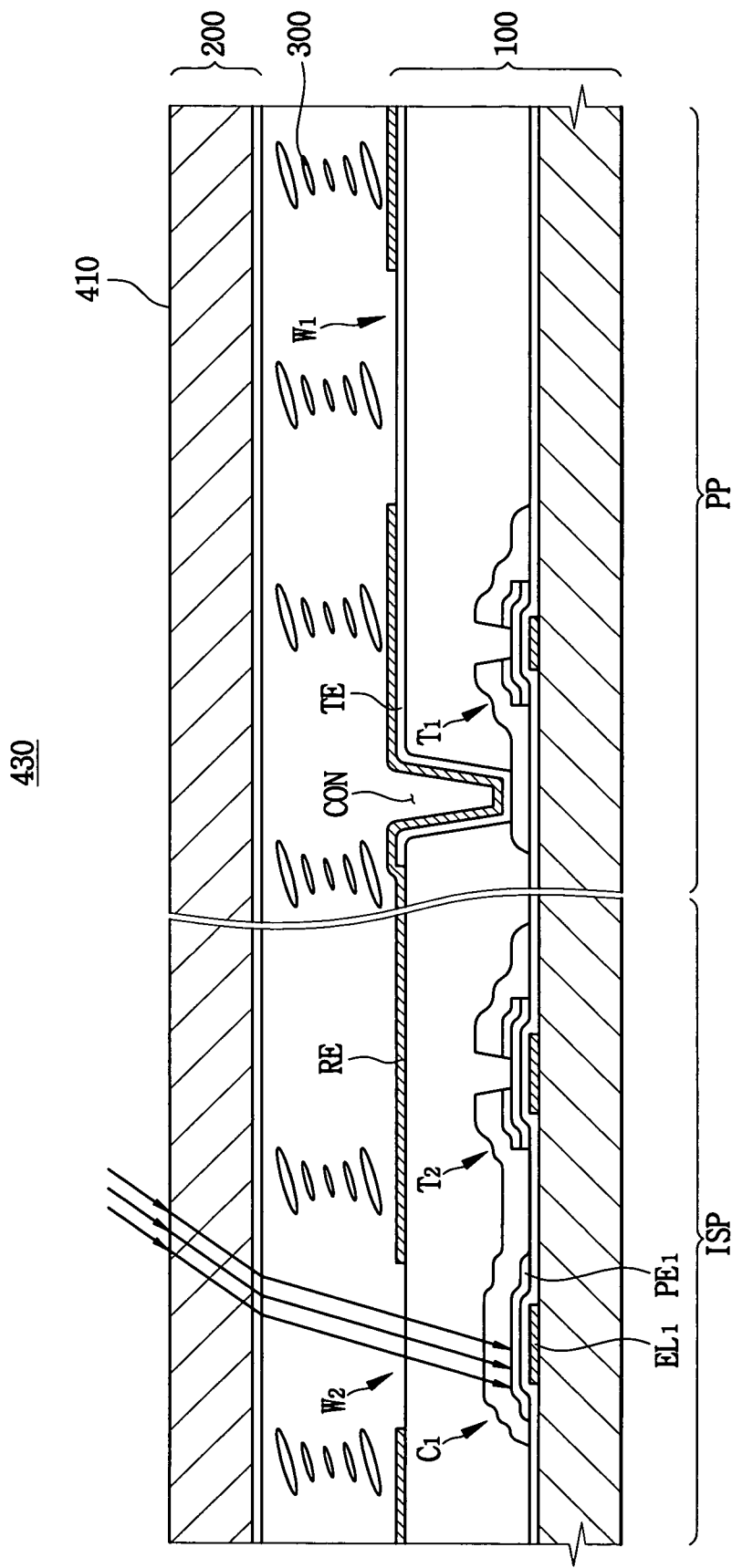
FIG. 10 is a cross-sectional view showing a liquid crystal display panel according to a third exemplary embodiment of the present invention.
Figure 11:
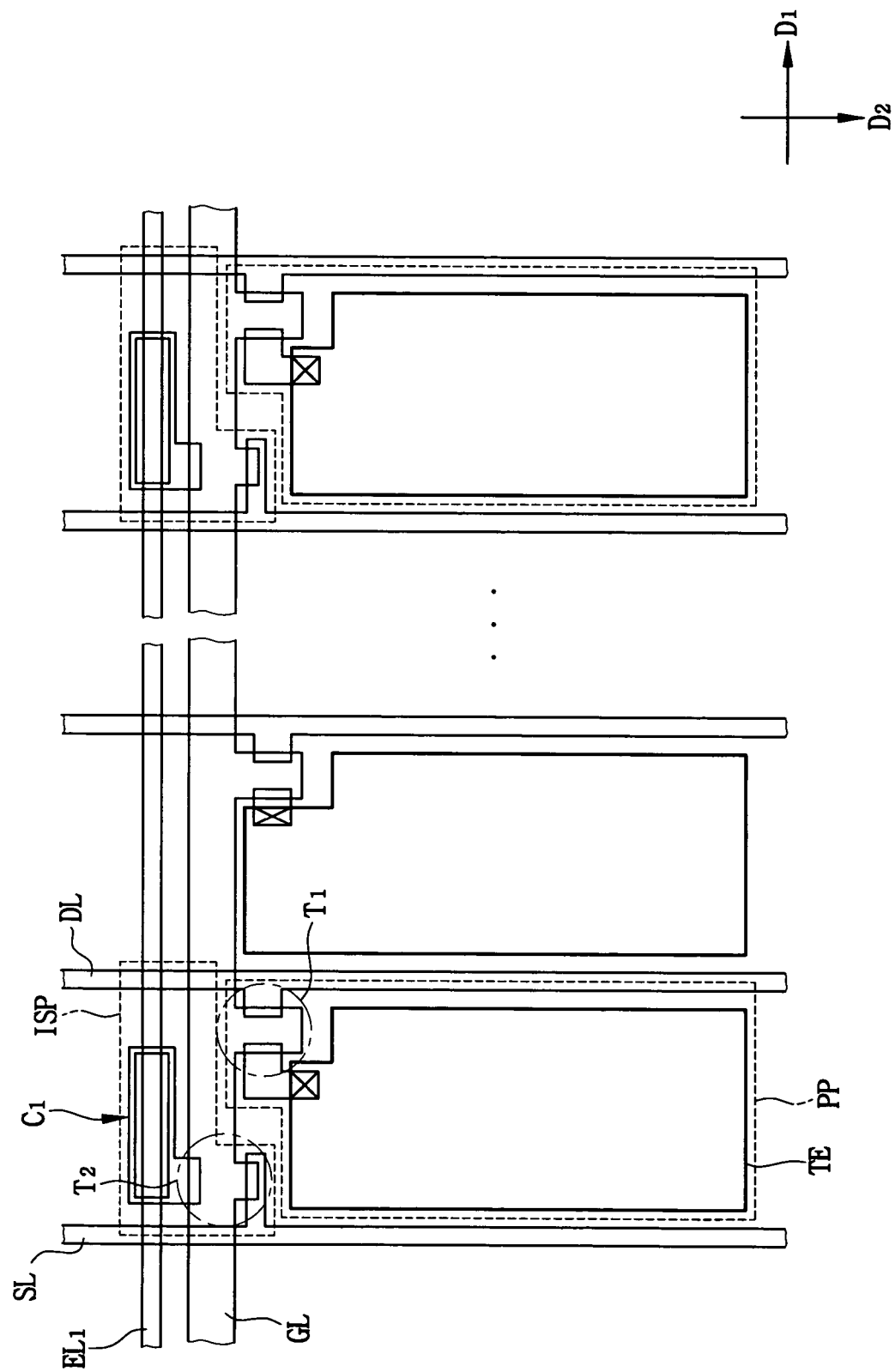
FIG. 11 is a layout showing an array substrate of FIG. 10.

FIG. 10 is a cross-sectional view showing a liquid crystal display panel according to a third exemplary embodiment of the present invention, and FIG. 11 is a layout showing an array substrate of FIG. 10.

Referring to FIGS. 1, 10 and 11, a liquid crystal display panel 430 according to a third exemplary embodiment of the present invention includes an array substrate 100. The array substrate 100 includes a plurality of pixels PP and a plurality of an infrared light sensing part ISP.

Each of the pixels PP includes a gate line GL, a data line DL, a first thin film transistor T1, a transparent electrode TE and a reflective electrode RE.

Each of the infrared light sensing part ISP includes a capacitor C1, a second thin film transistor T2 and a sensor line SL. The infrared light sensing part ISP perceives an infrared light and outputs an analog signal containing of location information.

The capacitor C1 includes a first electrode line EL1 and a pyroelectric thin film PE1. The capacitor C1 is electrically insulated from the gate line GL. The first electrode line EL1 is extended in the first direction D1. An insulation layer is disposed between the first electrode line EL1 and the pyroelectric thin film PE1. The pyroelectric thin film PE1 is disposed over the first electrode line EL1. The pyroelectric thin film PE1 comprises a pyroelectric material that has a conductance, when the infrared light is irradiated onto the pyroelectric material. When the infrared light is irradiated onto the pyroelectric material, a carrier is generated.

The first electrode line EL1 is electrically connected to the connecting part 500 to receive a signal from the connecting part 500. The first electrode line EL1 is formed on a plane where the gate line GL is formed. The first electrode line EL1 is spaced apart from the gate line GL1, so that the first electrode line EL1 is electrically insulated from the gate line GL1. The first electrode line is extended in the first direction D1.

The sensor line SL is formed on a plane where the data line DL is formed. The sensor line SL is spaced apart from the data line DL, so that the sensor line SL is electrically insulated from the date line DL. The sensor line SL is extended in the second direction D2 that is perpendicular to the first direction D1.

The second thin film transistor T2 includes a second gate electrode, a second source electrode and a third drain electrode. The second gate electrode diverges from the gate line GL. The second source electrode is electrically connected to the first pyroelectric thin film PE1. The drain electrode diverges from the sensor line SL.

The second source electrode of the second thin film transistor T2 covers the first pyroelectric thin film PE1, so that the second source electrode is electrically connected to the first pyroelectric thin film PE1. The second source electrode comprises the indium tin oxide (ITO) or the indium zinc oxide (IZO). The indium tin oxide and the indium zinc oxide are transparent and electrically conductive, so that the infrared light arrives at the first pyroelectric thin film PE1 via the second source electrode. The indium tin oxide or the indium zinc oxide may be deposited and patterned, so that the second drain electrode and the second source electrode of the second thin film transistor T2, the sensor line SL, the data line DL, and the first source electrode and the first drain electrode of the first thin film transistor T1 are formed simultaneously.

Figure 12:
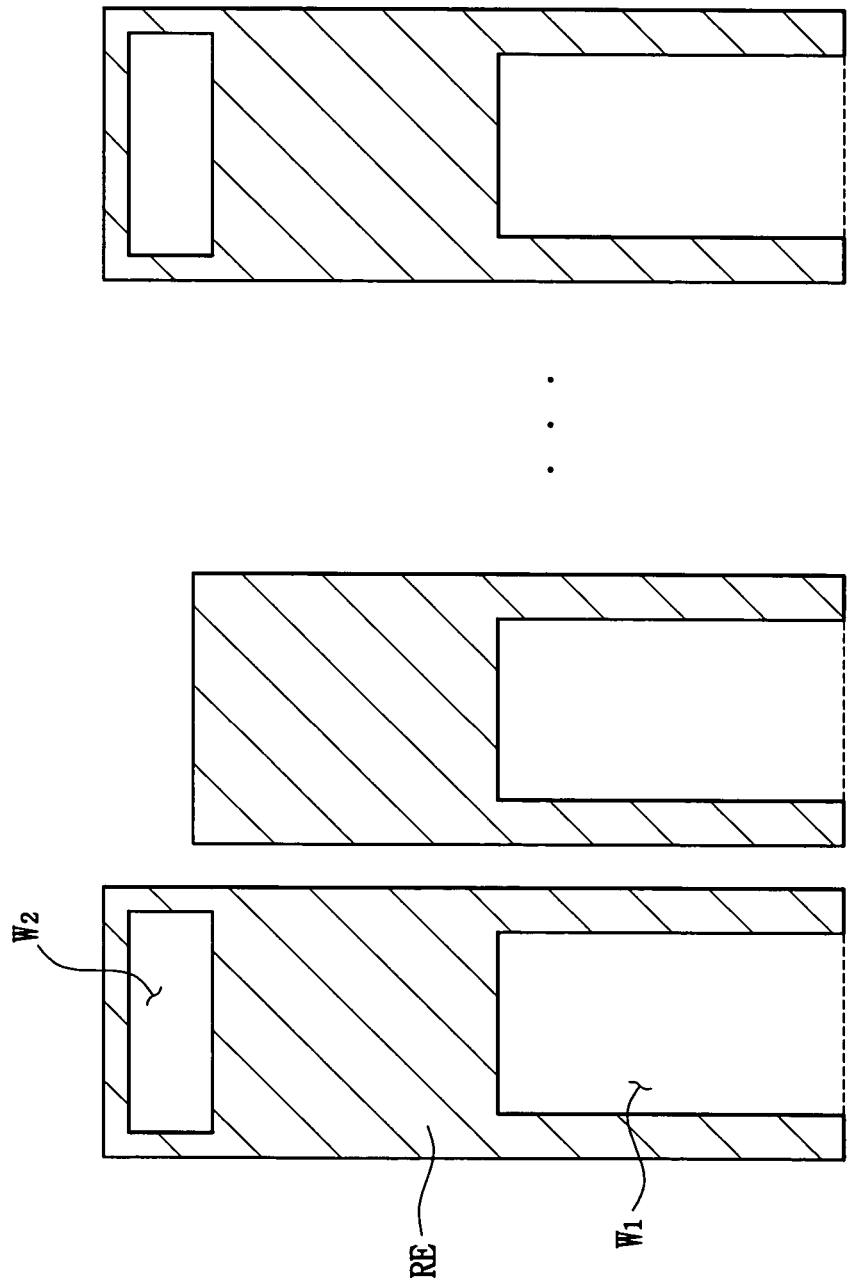
FIG. 12 is a plan view showing a reflective electrode formed on an array substrate of FIG. 11.

FIG. 12 is a plan view showing a reflective electrode formed on an array substrate of FIG. 11.

Referring to FIGS. 10 and 12, the transparent electrode is formed on an insulation layer. The transparent electrode TE is electrically connected to the first thin film transistor T1 via a contact hole CON. The contact hole CON penetrates an insulation layer so as to expose the first drain electrode of the first thin film transistor T1.

The reflective electrode RE is formed on the insulation layer. A portion of the reflective electrode RE overlaps with the transparent electrode TE. The reflection layer RE includes a transmission window W1 and an opening window W2. The transparent electrode is exposed through the transmission window W1. The first pyroelectric thin film PE1 is exposed through the opening window W2, so that the infrared light generated by a user arrives at the first pyroelectric thin film PE1.

In FIGS. 10 to 12, a transmissive and reflective type liquid crystal display device having the transparent electrode TE and the reflective electrode RE is disclosed for an example. However, the present invention may be applied to both of a transmissive type liquid crystal display device and a reflective type liquid crystal display device.

When the present invention is applied to the transmissive type liquid crystal display device, the transmissive type liquid crystal display device includes a covering member for covering the first thin film transistor T1, so that a light may not arrive at the first thin film transistor T1.

Figure 13:
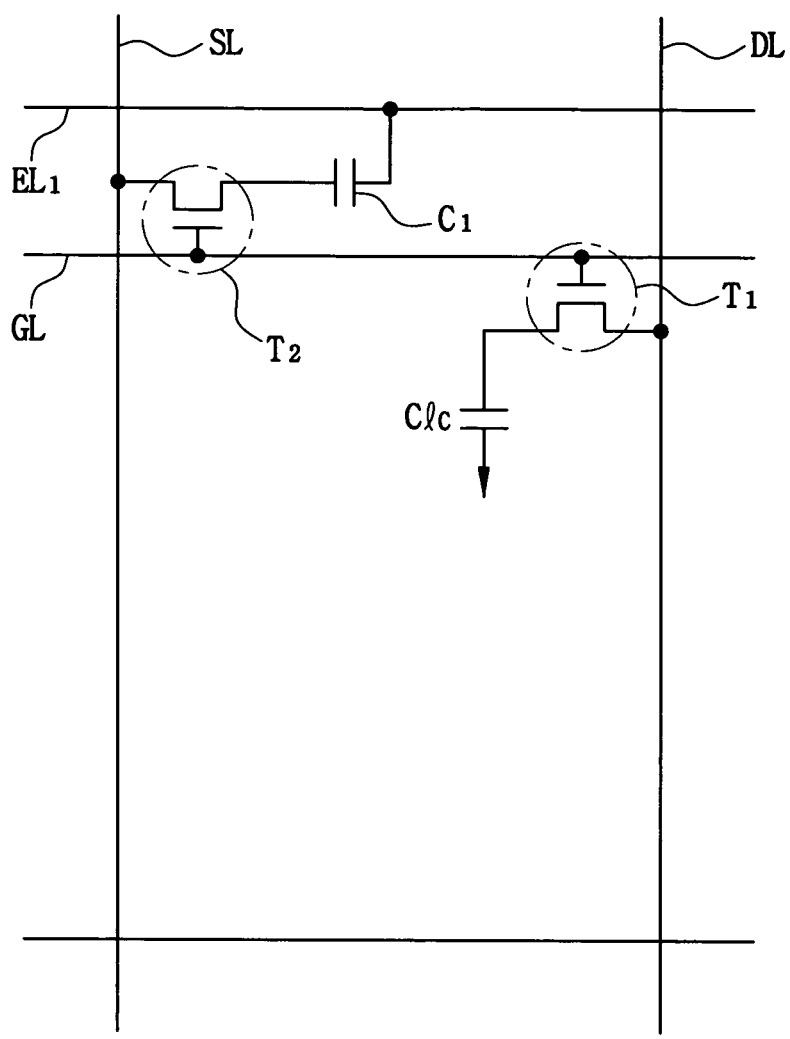
FIG. 13 is an equivalent circuit diagram of a pixel of an array substrate and a light sensing part of FIG. 11.

FIG. 13 is an equivalent circuit diagram of a pixel of an array substrate and a light sensing part of FIG. 11.

Referring to FIG. 13, each of the pixels PP includes a gate line GL, a data line DL, a first thin film transistor T1 and a liquid crystal capacitor Clc. The liquid crystal capacitor is electrically connected to a first drain electrode of the first thin film transistor T1.

Each of the infrared light sensing part ISP includes a first electrode line EL1, a first capacitor C1, a second thin film transistor T2 and a sensor line SL.

When the infrared light sensing part ISP perceives the infrared light, the first capacitor C1 stores charges that correspond to a first signal. When the second thin film transistor T2 is turned on in response to the second signal applied to the gate line GL, the first signal is transferred to the second drain electrode of the second thin film transistor T2 via the second source electrode of the second thin film transistor T2. The second signal is outputted from the connecting part 600, and it is applied to the first gate electrode of the first thin film transistor T1.

The first signal applied to the second drain electrode of the second thin film transistor T2 is transferred to the connecting part 500 via the sensor line SL. Therefore, the connecting part 500 may receive location information of a position where the light enters.

Figure 14:
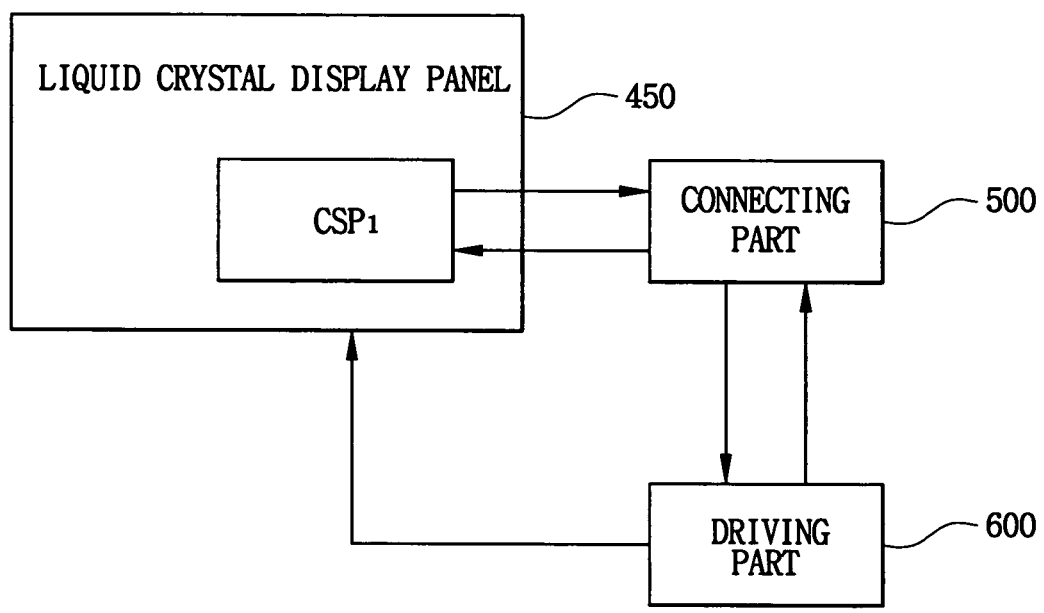
FIG. 14 is a block diagram showing a liquid crystal display device according to a fourth exemplary embodiment of the present invention.

FIG. 14 is a block diagram showing a liquid crystal display device according to a fourth exemplary embodiment of the present invention.

Referring to FIG. 14, a liquid crystal display device 900 according to a fourth exemplary embodiment of the present invention includes a liquid crystal display panel 450, a compression sensing part CSP1, a connecting part 500 and a driving part 600.

The liquid crystal display panel 450 includes a display surface. The display surface displays an image. A compression signal of a user is received through the display surface.

The liquid crystal display panel 450 has the compression sensing part CSP1 therein. The compression sensing part CSP1 perceives the compression signal and outputs an analog signal containing location information that is a position where the user compresses. Then, the analog signal is transferred to the connecting part 500.

The connecting part 500 controls the compression sensing part CSP1 in response to a control signal outputted from the driving part 600, so that the compression sensing part CSP1 perceives the compression signal. The connecting part 500 transforms the analog signal containing the location information into a digital signal. The digital signal is then transferred to the driving part 600.

The driving part 600 supplies the connecting part with the control signal. The driving part 600 outputs a driving signal for driving the liquid crystal display panel 450 in response to the digital signal of the connecting part 500. Therefore, an image is displayed on the display surface of the liquid crystal display panel 450 in response to the driving signal. The image corresponds to instructions of the user.

Figure 15:
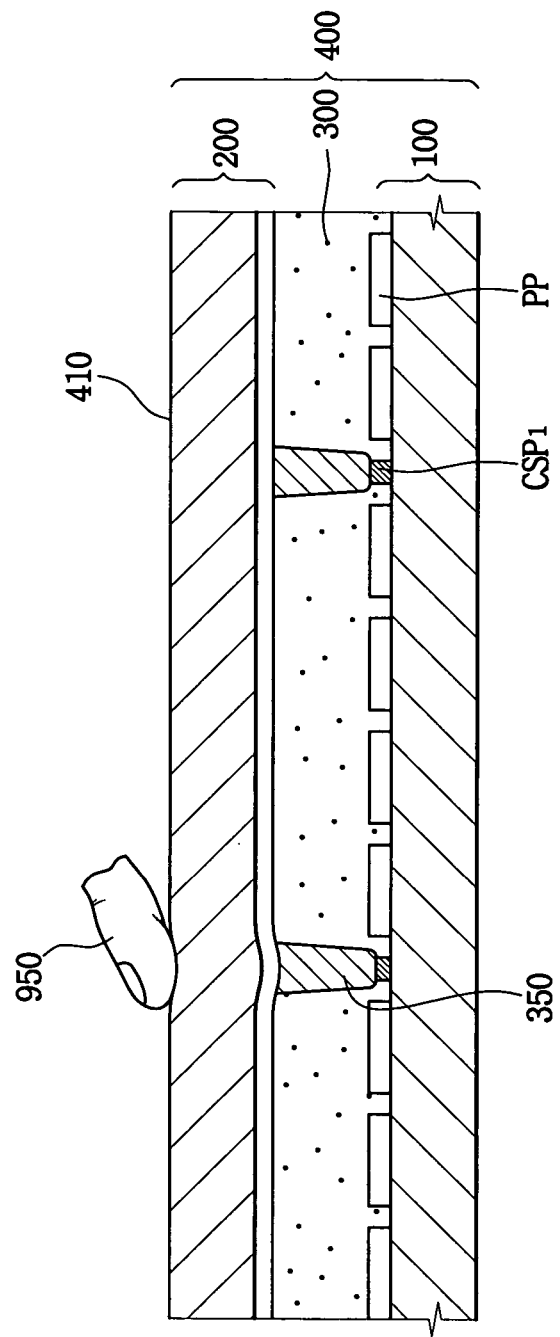
FIG. 15 is a schematic cross-sectional view showing a liquid crystal display panel of FIG. 14.
Figure 16:
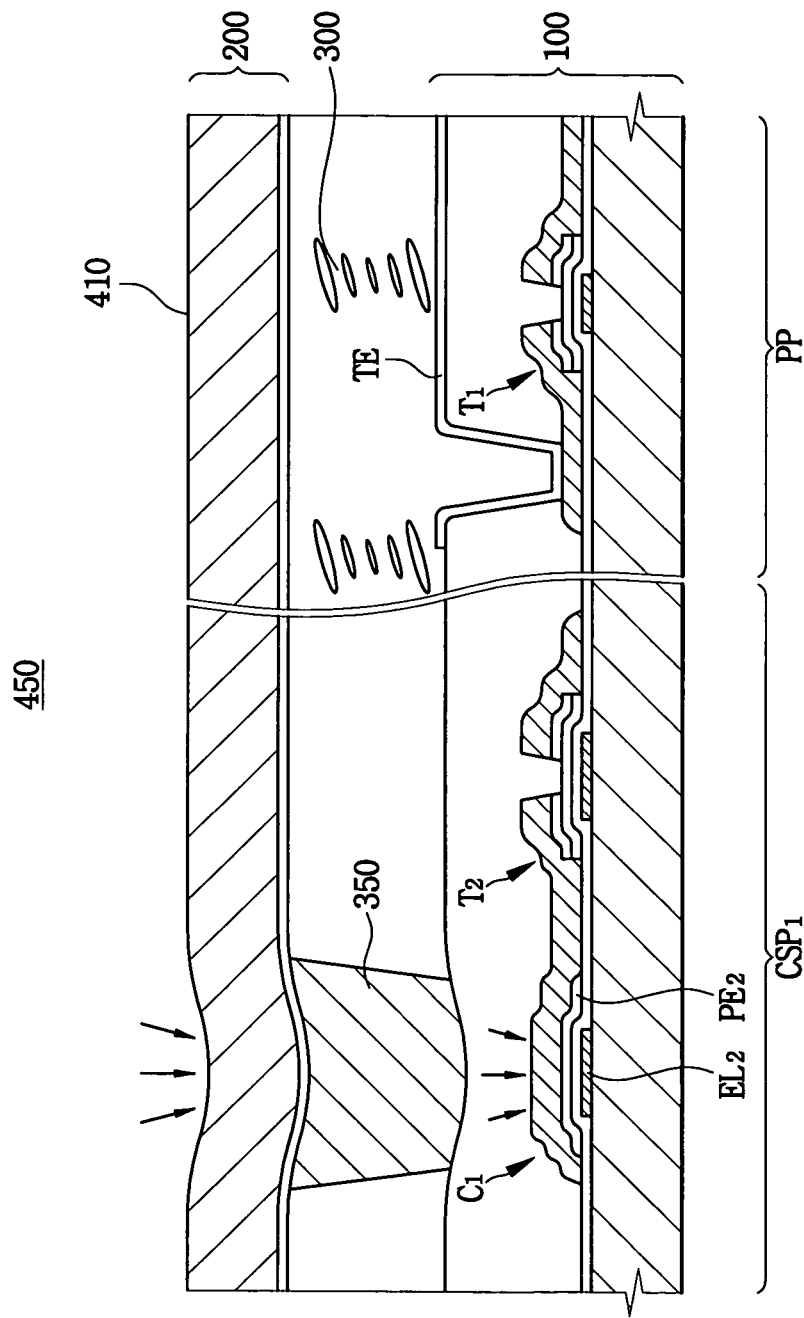
FIG. 16 is an enlarged view showing a liquid crystal display panel of FIG. 15.

FIG. 15 is a schematic cross-sectional view showing a liquid crystal display panel of FIG. 14, and FIG. 16 is an enlarged view showing a liquid crystal display panel of FIG. 15.

Referring to FIGS. 15 and 16, a liquid crystal display panel includes an array substrate 100, a color filter substrate 200, a liquid crystal layer 300 and a cell gap retaining member 350. The color filter substrate 200 faces the array substrate 100. The liquid crystal layer 300 is interposed between the array substrate 100 and the color filter substrate 200. The cell gap retaining member 350 maintains the distance of the gap formed between the array substrate 100 and the color filter substrate 200.

The array substrate 100 includes a plurality of pixels PP and a plurality of compression sensing parts CSP1. The pixels PP are arranged in a matrix shape. The compression sensing part CSP1 perceives a compression signal.

The cell gap retaining member 350 is disposed on the compression sensing parts CSP1. Therefore, when a display face 410 is pressed by a finger 950 or pen, the compression is then transferred to the compression sensing part CSP1 via the cell gap retaining member 350.

The color filter substrate 200 may comprise a plastic material that is flexible so as to transfer the compression to the compression sensing part CSP1. However, the array substrate 100 may comprise a glass that is not flexible, because the array substrate 100 is not related to the compression.

Figure 17:
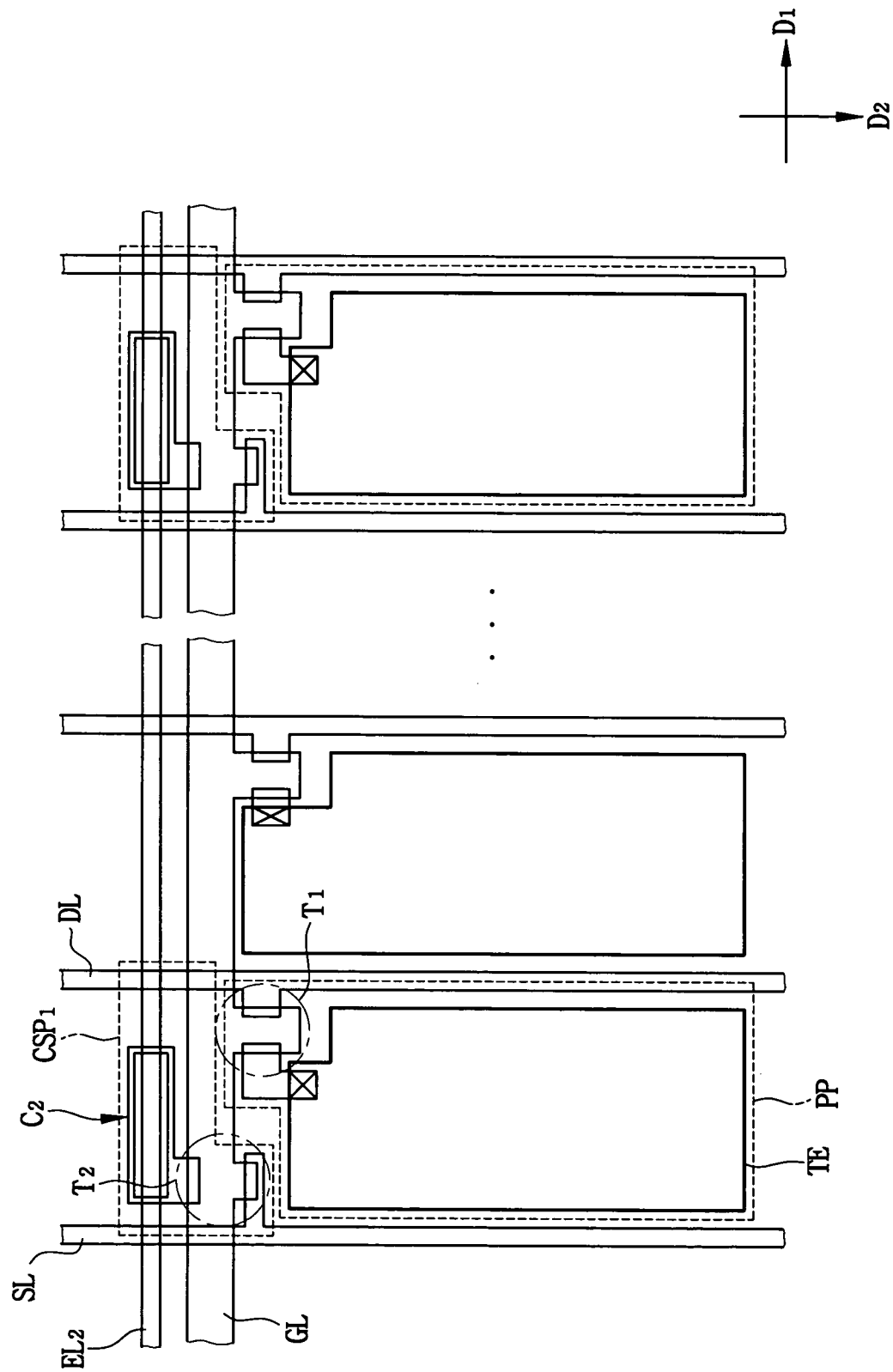
FIG. 17 is a layout showing an array substrate of FIG. 16.

FIG. 17 is a layout showing an array substrate of FIG. 16.

Referring to FIGS. 15, 16 and 17, each of the pixels includes a gate line GL, a data line DL, a first thin film transistor T1 and a transparent electrode TE.

Each of the compression sensing part CSP1 includes a second capacitor C2, a second thin film transistor T2 and a sensor line SL. The compression sensing part CSP1 perceives a location where the display face of the liquid crystal display panel is compressed. The compression sensing part CSP1 outputs an analog signal containing location information.

The second capacitor C2 is electrically insulated from the gate line GL. The second capacitor C2 includes a second electrode line EL2 and a piezoelectric thin film PE2. The second electrode line EL2 is extended in a first direction D1. An insulation layer is disposed between the second electrode line EL2 and the piezoelectric thin film PE2. The piezoelectric thin film PE2 is disposed over the second electrode line EL2. The piezoelectric thin film PE2 comprises a piezoelectric material such as a polyvinylidene fluoride (PTDF) and a polyvinyl fluoride (PVF).

When the piezoelectric material is compressed, carriers are generated.

The second electrode line EL2 is electrically connected to the connecting part 500 so as to receive signals.

The second thin film transistor T2 includes a second gate electrode, a source electrode and a drain electrode. The second gate electrode diverges from the gate line GL. The second source electrode is electrically connected to the piezoelectric thin film PE2. The second drain electrode diverges from the sensor line SL.

Figure 18:
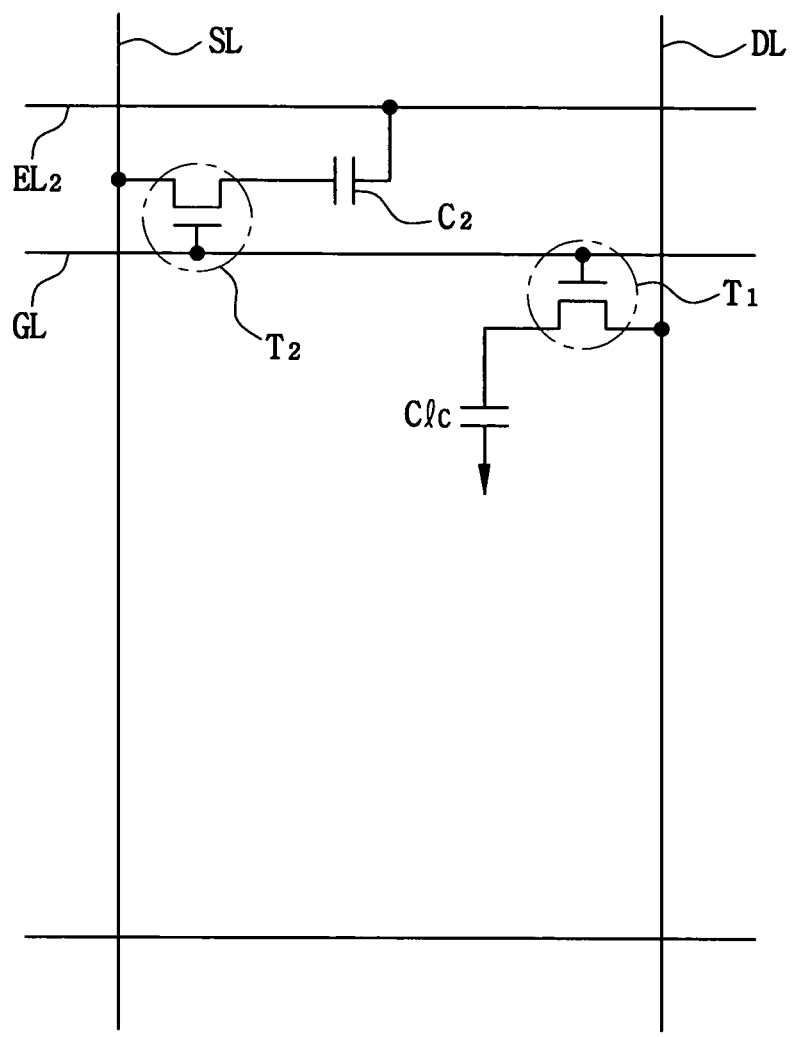
FIG. 18 is an equivalent circuit diagram of a pixel of an array substrate and a light sensing part of FIG. 17.

FIG. 18 is an equivalent circuit diagram of a pixel of an array substrate and a light sensing part of FIG. 17.

Referring to FIGS. 14 and 18, each of the pixels includes a gate line GL, a data line DL, a first thin film transistor T1 and a liquid crystal capacitor Clc. The liquid crystal capacitor Clc is electrically connected to a first drain electrode of the first thin film transistor T1. Each of the compression sensing part CSP1 includes a second electrode line EL2, a second capacitor C2, a second thin film transistor T2 and a sensor line SL.

When the compression sensing part CSP1 is compressed, the second capacitor C2 stores charges that corresponds to a first signal. When the second thin film transistor T2 is turned on in response to a second signal applied to the gate line GL, the first signal is then transferred to the second drain electrode of the second thin film transistor T2 via the second source electrode of the second thin film transistor T2. The second signal corresponds to a gate driving signal outputted from the driving part 600.

The first signal outputted from the second drain electrode is applied to the sensor line SL to be transferred to the connecting part 500 via the sensor line SL. Therefore, the connecting part 500 receives the location information generated from the compression sensing part CSP1 via the sensor line SL.

Figure 19:
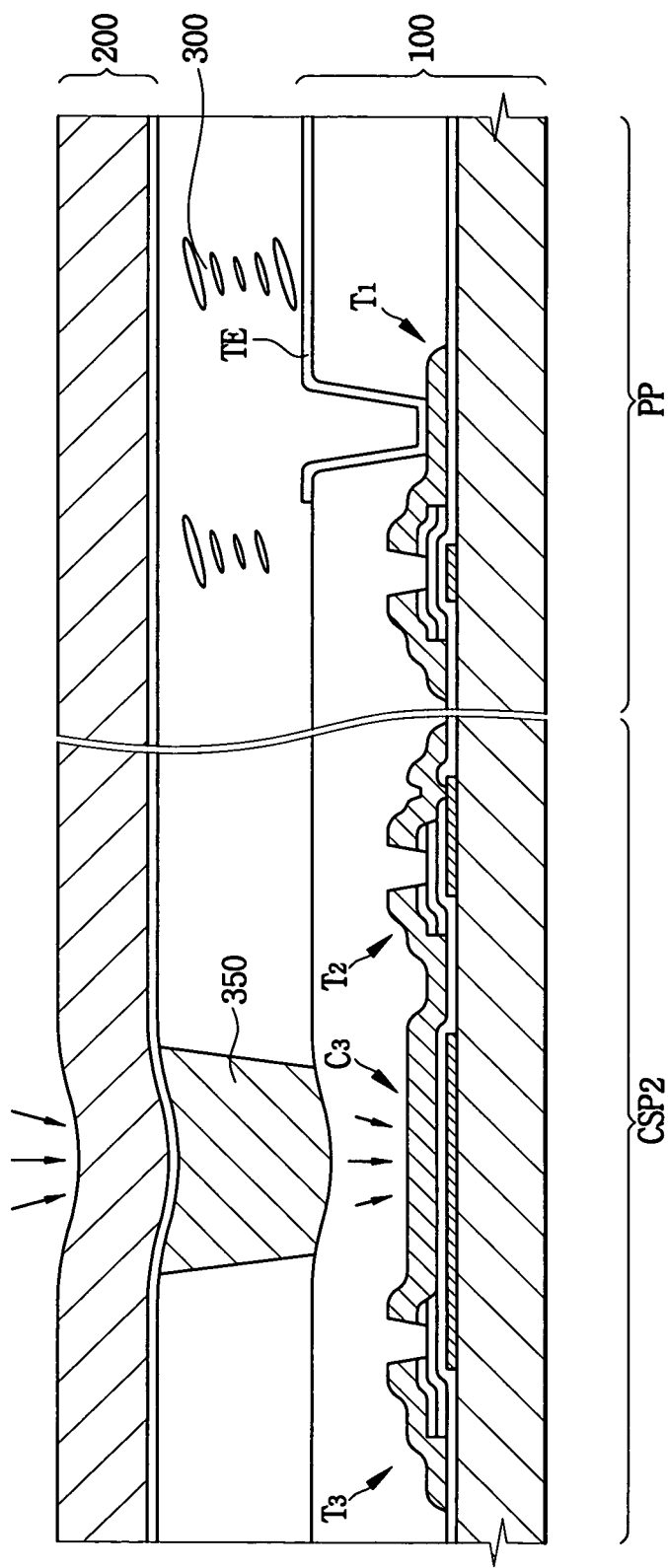
FIG. 19 is a cross-sectional view showing a liquid crystal display panel according to a fifth exemplary embodiment of the present invention.
Figure 20:
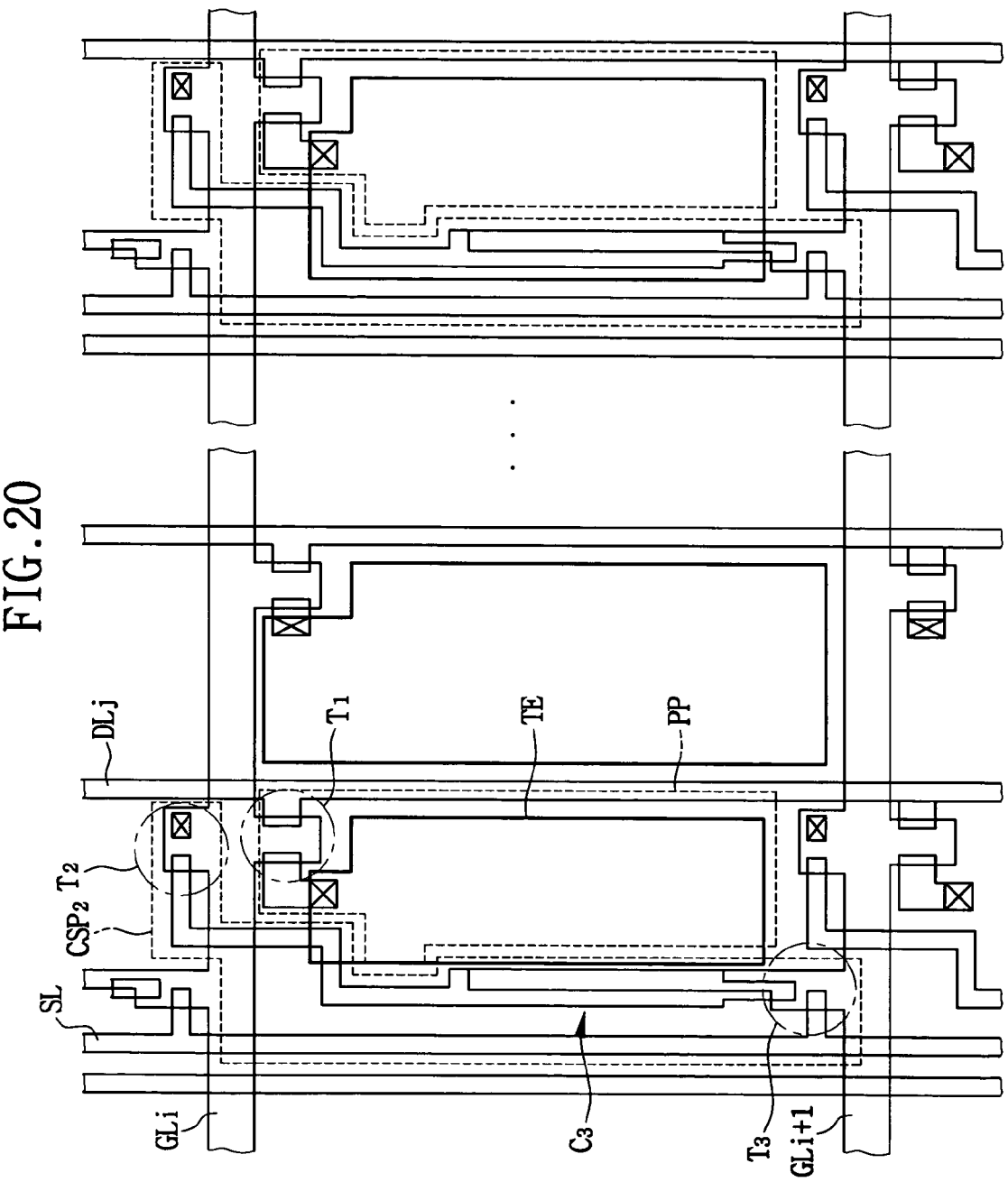
FIG. 20 is a layout showing an array substrate of FIG. 19.

FIG. 19 is a cross-sectional view showing a liquid crystal display panel according to a fifth exemplary embodiment of the present invention, and FIG. 20 is a layout showing an array substrate of FIG. 19.

Referring to FIGS. 19 and 20, an array substrate 100 according to a fifth exemplary embodiment includes a plurality of pixels PP and a plurality of compression sensing part CSP2 where the compression sensing part CSP2 perceives compression.

The array substrate 100 includes an n-number of gate lines and an m-number of data lines, where 'm' and 'n' are natural numbers that are greater than 1. Each of the pixels includes an i-th gate line GLi of the n-number of gate lines, a j-th data line DLj, a first thin film transistor T1 and transparent electrode TE, where 'i' is one of numbers from 1 to n and 'j' is one of numbers from 1 to m. The first thin film transistor T1 is electrically connected to the i-th gate line GLi and the j-th data line DLj. The transparent electrode TE is electrically connected to the first thin film transistor T1.

Each of the compression sensing parts CSP2 includes a second thin film transistor T2, a third thin film transistor T3, a third capacitor C3 and a sensor line SL. The second thin film transistor T2 is electrically connected to the i-th gate line GLi. The third thin film transistor T3 is electrically connected to the (i+1)-th gate line GLi+1. The third capacitor C3 is electrically connected to the second thin film transistor T2 and the third thin film transistor T3.

The third thin film transistor T3 includes a third gate electrode, a third source electrode and a third drain electrode. The third gate electrode diverges from the (i+1)-th gate line GLi+1. The third source electrode is electrically connected to the third capacitor C3 and the second thin film transistor T2. The third drain electrode diverges from the sensor line SL.

The second thin film transistor T2 includes a second gate electrode, a second source electrode and a second drain electrode. The second gate electrode diverges from the i-th gate line GLi. The second source electrode is electrically connected to the second gate electrode. The second drain electrode is electrically connected to the third source electrode of the third thin film transistor T3 and the third capacitor C3.

The third capacitor C3 includes a first electrode and a second electrode. The first electrode faces the second electrode. An insulation layer is interposed between the first electrode and the second electrode. The first electrode is electrically connected to the second drain electrode of the second thin film transistor T2 and the third source electrode of the third thin film transistor T3. The second electrode of the third capacitor C3 is electrically connected to the third gate electrode of the third thin film transistor T3. The first electrode and the second electrode of the third capacitor are disposed below the cell gap retaining member 350.

Figure 21:
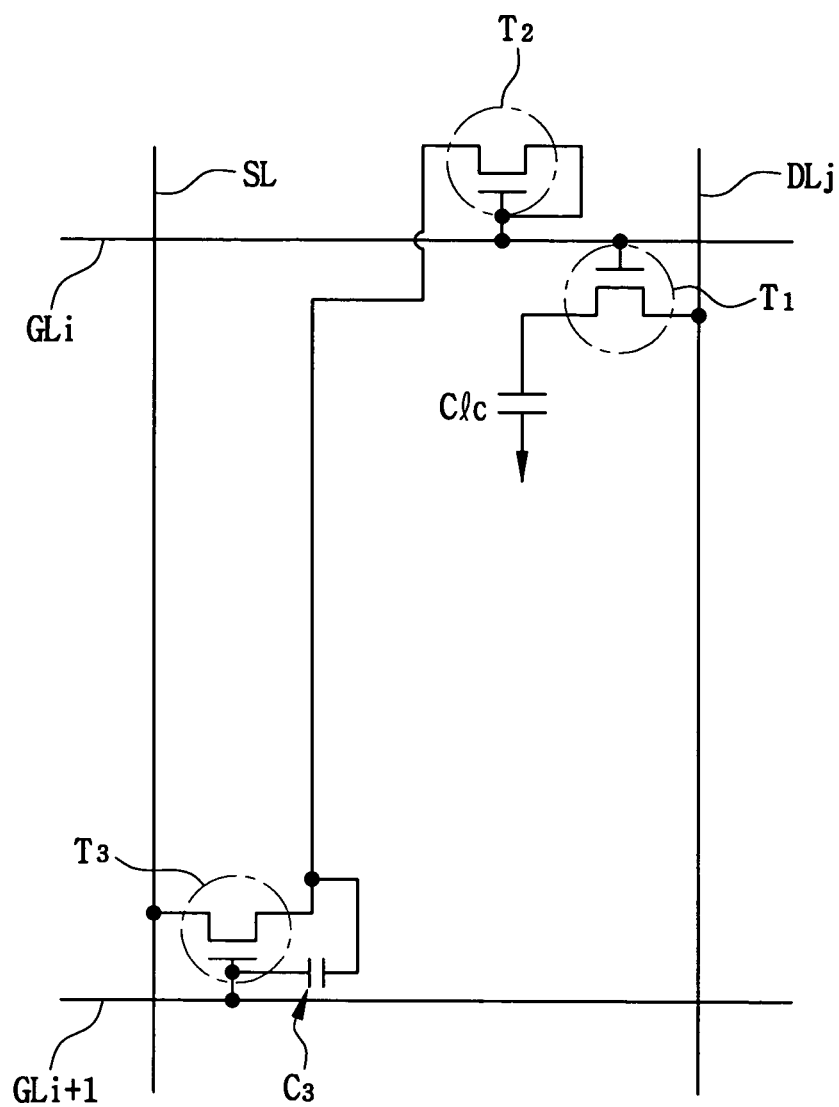
FIG. 21 is an equivalent circuit diagram of a pixel of an array substrate and a light sensing part of FIG. 20.

FIG. 21 is an equivalent circuit diagram of a pixel of an array substrate and a light sensing part of FIG. 20.

Referring to FIG. 21, each of the pixels includes an i-th gate electrode line GLi, a j-th data line DLj, a first thin film transistor T1 and a liquid crystal capacitor Clc. The liquid crystal capacitor Clc is electrically connected to a first drain electrode of the first thin film transistor T1.

Each of the compression sensing part CSP 2 includes a second thin film transistor T2, a third capacitor C3, a third thin film transistor T3 and a sensor line SL.

The second thin film transistor T2 is turned on in response to a first signal applied to the i-th gate line GLi. Then, a first signal applied from the second source electrode is transferred to the second drain electrode. The first signal is a gate driving signal that is outputted from the driving part and applied to the i-th gate line GLi.

When the compression sensing part is compressed, the third capacitor stores charges corresponding to a second signal. The third thin film transistor T3 is turned on in response to the second signal stored in the third capacitor C3, so that the first signal supplied from the second thin film transistor T2 is transferred to the sensor line SL.

The first signal is supplied to the connecting part 500 via the sensor line. Therefore, the connecting part 500 receives the location information from the compression sensing part CSP2 via the first signal.

Figure 22:
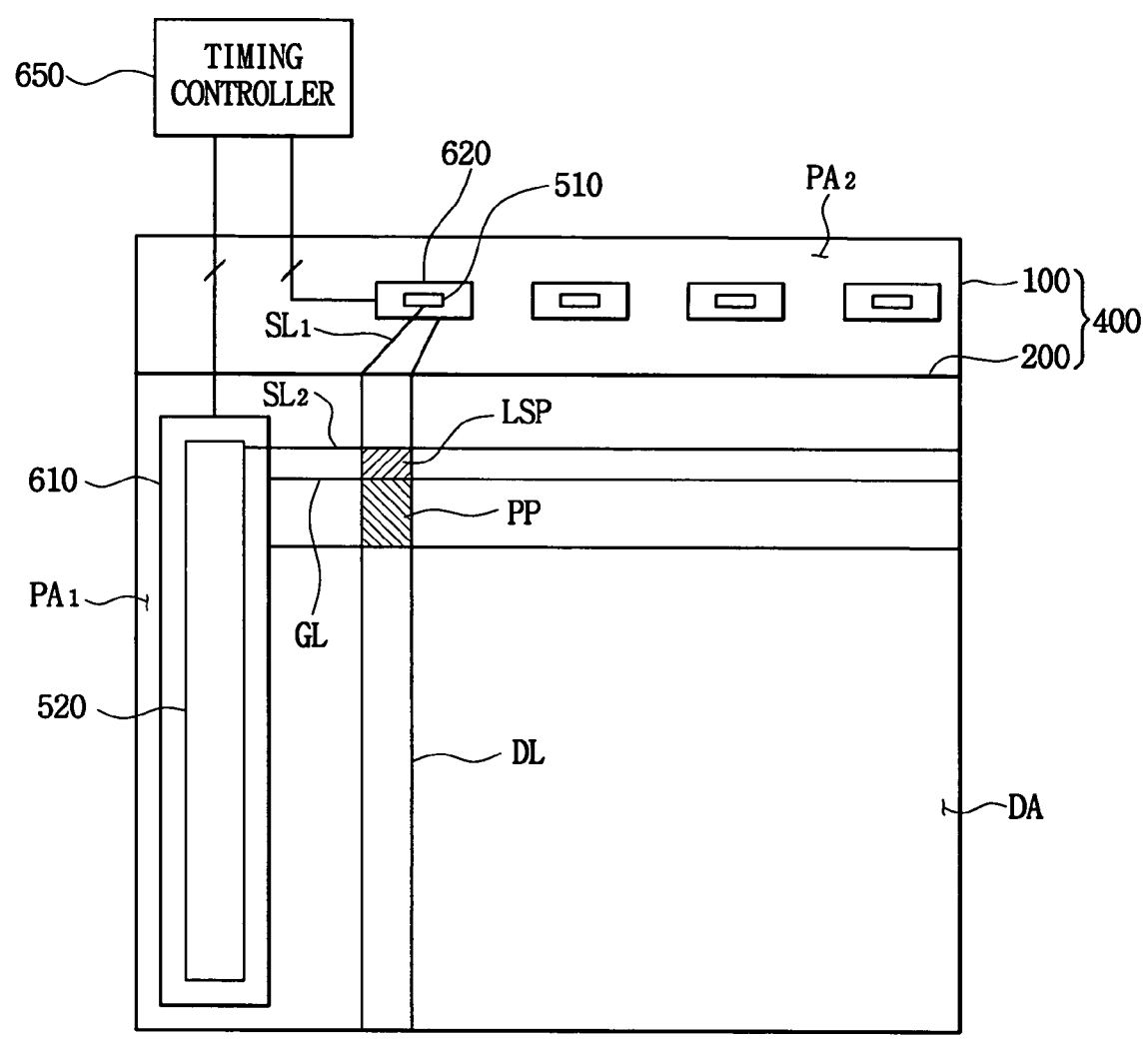
FIG. 22 is a plan view showing a liquid crystal display device according to a sixth exemplary embodiment of the present invention.

FIG. 22 is a plan view showing a liquid crystal display device according to a sixth exemplary embodiment of the present invention. For example, a liquid crystal display panel according to a first exemplary example of FIGS. 1 to 5 is used as a liquid crystal display panel of the liquid crystal display device of FIG. 22, so that the same reference numerals denote the same elements in FIGS. 1 to 5, and thus the detailed descriptions of the same elements will be omitted.

Referring to FIG. 22, a liquid crystal display device 1000 according to a sixth exemplary embodiment includes a liquid crystal display panel 400, a gate driving part 610 and a data driving part 620. The liquid crystal display panel 400 includes a light sensing part LSP1. The gate driving part 610 and the data driving part drive the liquid crystal display panel 400. The liquid crystal display device 1000 further includes a first connecting part 510 and a second connecting part 520. The data driving part 620 has the first connecting part 510 therein. The first connecting part 510 transforms an analog signal outputted from a second sensor line SL2 into a digital signal. The gate driving part 610 has the second connecting part 520 therein. The second connecting part 520 controls the light sensing part LSP.

A timing controller 650 controls the gate driving part 610, the data driving part 620, the first connecting part 510 and the second connecting part 520. The timing controller 650 outputs a control signal for controlling the first connecting part 510 and the second connecting part 520. The timing controller 650 receives the digital signal from the second connecting part 520. Then the timing controller 650 controls the gate driving part 610 and the data driving part 620 in response to the digital signal so as to drive the liquid crystal display panel 400.

The liquid crystal display panel 400 includes a display region DA and a first peripheral region PA1 and a second peripheral region PA2. The display region DA displays an image. The first peripheral region PA1 and the second peripheral region PA2 are disposed adjacent to the display region DA. The display region DA of the liquid crystal display panel 400 includes light sensing parts LSP and pixels PP.

The gate driving part 610 is formed in the first peripheral region PA1 via a process of manufacturing the pixels PP. The data driving part 620 is formed in the second peripheral region PA2 via the process of manufacturing the pixels PP. The data driving part 620 has the first connecting part 510 therein. The driving part 620 is mounted on the second peripheral region PA2. The gate driving part 610 has the second connecting part 520 therein. The gate driving part 610 is formed on the first peripheral region PA1.

As described above, the first connecting part 510 is mounted on the second peripheral region PA2 and the second connecting part 520 is formed on the first peripheral region PA1, so that an additional space for disposing the first connecting part 510 and the second connecting part 520 is not necessary. Therefore, a size of the liquid crystal display device 1000 is reduced.

Figure 23:
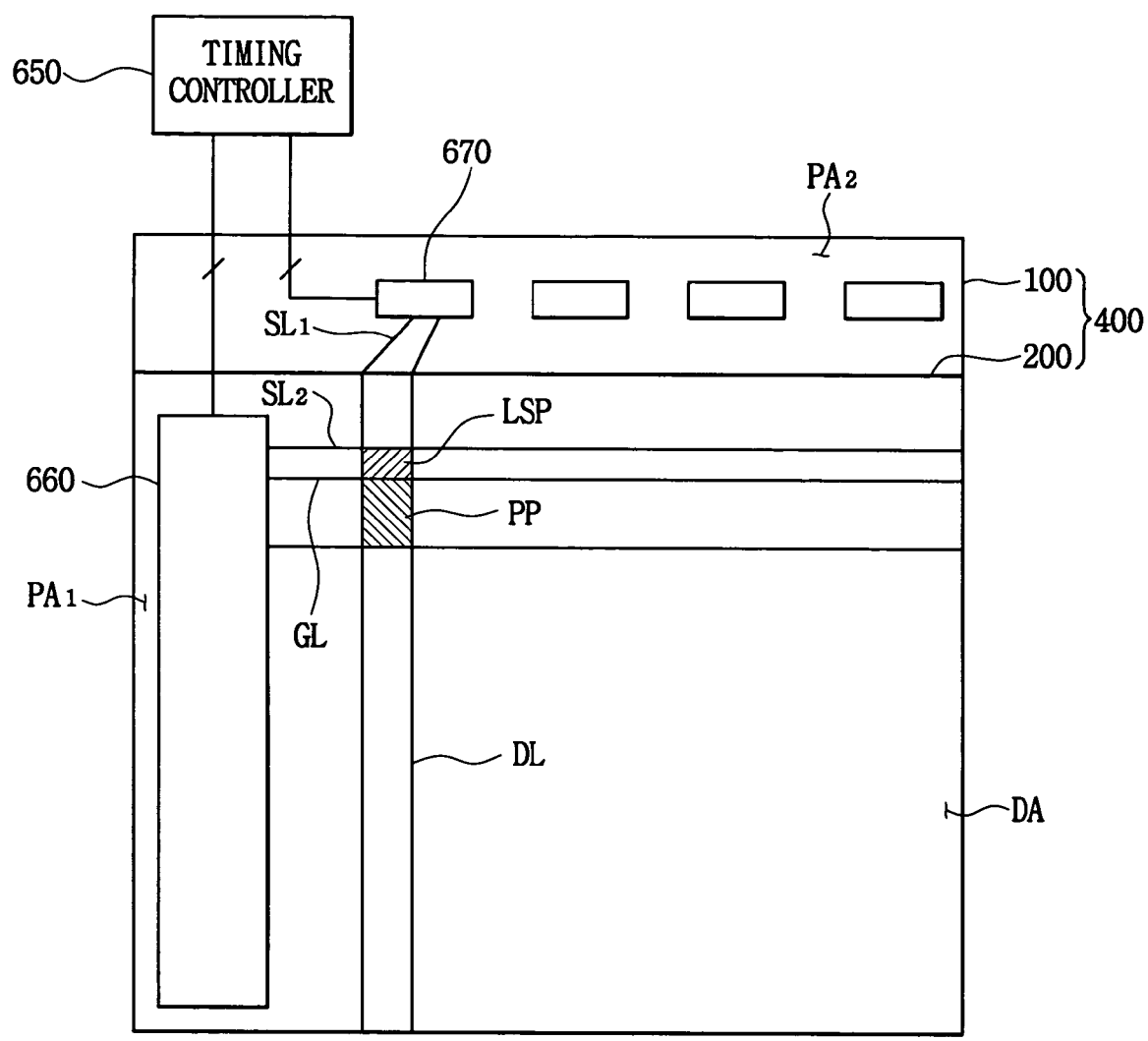
FIG. 23 is a plan view showing a liquid crystal display device according to a seventh exemplary embodiment of the present invention.

FIG. 23 is a plan view showing a liquid crystal display device according to a seventh exemplary embodiment of the present invention.

Referring to FIG. 23, a liquid crystal display device 1000 includes a liquid crystal display panel 400 having a light sensing part LSP, a gate driving part 660 and a data driving part 670. A timing controller 650 controls the gate driving part 660 and the data driving part 670.

The gate driving part 660 is electrically connected to the light sensing part LSP via a first sensor line SL1. The data driving part 670 is electrically connected to the light sensing part LSP via a second sensor line SL2.

The gate driving part 660 controls the light sensing part LSP in response to a first control signal outputted from the timing controller 650. The data driving part 670 receives an analog signal outputted from the light sensing part LSP in response to the second signal outputted from the timing controller 650. The analog signal is then transformed into a digital signal.

The timing controller 650 receives the digital signal from the data driving part 670. Then, the timing controller 650 drives the liquid crystal display panel 400 so as to display an image via the gate driving part 660 and the data driving part 670 in response to the digital signal.

In FIGS. 22 and 23, the gate driving parts 610 and 660 are formed on the liquid crystal display panel 400. However, the gate driving parts 610 and 660 may be formed in a chip that may be mounted on the liquid crystal display panel 400.

According to a liquid crystal display panel, a liquid crystal display device and a method of manufacturing the liquid crystal display device, the liquid crystal display panel includes a light sensing part (or compression sensing part) for generating an analog signal containing location information of position where the light enters (or where the liquid crystal display panel is compressed).

Therefore, the liquid crystal display device does not need an additional touch panel, so that an air space formed between the liquid crystal display panel and the touch panel does not exist. Thus a display quality is enhanced on one hand, a thickness of the liquid crystal display device is reduced on the other hand.

The light sensing part (or the compression sensing part) is formed via the process of manufacturing the liquid crystal display panel, so that an additional process is not necessary. As a result, a manufacturing cost is reduced and productivity is enhanced.

Further, a count (or number) of switching devices connected to a first data line is equal to a count of switching devices connected to a second data line, so that electrical load of the data lines are equal with each other. Therefore, electrical load is reduced, and a cross talk and a flicker are reduced to enhance the display quality of the liquid crystal display device.

Having described the exemplary embodiments of the present invention and its advantages, it is noted that various changes, substitutions and alterations can be made herein without departing from the spirit and scope of the invention as defined by appended claims.

What is claimed is:

1. A liquid crystal display device comprising:
   a liquid crystal display panel including a plurality of pixels and a plurality of sensing parts, each of the sensing parts having a light-sensitive switching device which is directly responsive to light and each of the sensing parts generating an analog signal including a location information in response to an incident light, the location information indicating a location where the light enters; and
   a control part receiving the analog signal and transforming the analog signal into a digital signal, the liquid crystal display device being controlled in response to the digital signal,
   wherein each of the pixels includes a first switching device and a pixel electrode electrically connected to the first switching device, wherein the first switching device includes a gate electrode electrically connected to a gate line, a source electrode electrically connected to a data line and a drain electrode electrically connected to the pixel electrode so that a data signal is provided to the pixel electrode through the data line and the source electrode,
   wherein the light-sensitive switching device is a second switching device electrically connected to receive a first analog signal from the data line and is turned on in response to the incident light to output the first analog signal to a third switching device outputting the first analog signal in response to a second analog signal applied to the gate line, and
   wherein each of the sensing parts further comprises a first sensor line receiving the first analog signal from the third switching device and transmitting the first analog signal to the control part, wherein the first sensor line is electrically insulated from the data line and directly connected to the third switching device.

2. The liquid crystal display device of claim 1, wherein each of the sensing parts further comprises a second sensor line.

3. The liquid crystal display device of claim 2, wherein the second switching device includes a first gate electrode diverging from the second sensor line, a first source electrode diverging from the data line, and a first drain electrode being electrically connected to the third switching device.

4. The liquid crystal display device of claim 1, wherein the third switching device includes a first gate electrode diverging from the gate line, a first source electrode being electrically connected to the second switching device, and a first drain electrode being electrically connected to the first sensor line.

5. The liquid crystal display device of claim 1, wherein the first switching device, the second switching device and the third switching device each correspond to an amorphous-silicon thin film transistor.

6. The liquid crystal display device of claim 1, wherein the pixel electrode comprises a transparent electrode and a reflective electrode including a transmission portion and a reflection portion, the reflective electrode facing the transparent electrode.

7. The liquid crystal display device of claim 6, wherein the reflective electrode comprises an opening window uncovering the sensing part, the incident light passing through the opening window and arriving at the sensing part.

8. The liquid crystal display device of claim 1, wherein the incident light is an infrared light.

9. The liquid crystal display device of claim 8, wherein the second switching device includes a first source electrode diverging from the data line, and a first drain electrode being electrically connected to the third switching device, wherein the first sensor line, the first source electrode and the first drain electrode of the second switching device comprise a transparent and electrically conductive material.

10. The liquid crystal display device of claim 9, wherein the pixel electrode comprises a transparent electrode and a reflective electrode including a transmission portion and a reflection portion, the reflective electrode facing the transparent electrode.

11. The liquid crystal display device of claim 10, wherein the reflective electrode comprises an opening window exposing the light-sensitive switching device, the infrared light passing through the opening window and arriving at the light-sensitive switching device.

12. The liquid crystal display device of claim 1, wherein the control part comprises:
   a connecting part to receive the analog signal and transform the analog signal into the digital signal in response to a first control signal;
   a first driving part to drive the liquid crystal display panel in response to a second control signal; and
   a second driving part to provide the connecting part with the first control signal and to receive the digital signal from the connecting part to output the second control signal.

13. The liquid crystal display device of claim 12, wherein the first driving part is formed in a chip, the chip being mounted on the liquid crystal display panel, the chip having the connecting part therein.

14. The liquid crystal display device of claim 12, wherein the first driving part and the connecting part are integrally formed in the liquid crystal display panel.

* * * * *